United States Patent
Ono

(10) Patent No.: US 10,171,799 B2
(45) Date of Patent: Jan. 1, 2019

(54) PARALLAX IMAGE DISPLAY DEVICE, PARALLAX IMAGE GENERATION METHOD, PARALLAX IMAGE PRINT

(71) Applicant: FUJIFILM Corporation, Tokyo (JP)

(72) Inventor: Shuji Ono, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 853 days.

(21) Appl. No.: 14/081,333

(22) Filed: Nov. 15, 2013

(65) Prior Publication Data

US 2014/0085442 A1 Mar. 27, 2014

Related U.S. Application Data

(63) Continuation of application No. PCT/JP2012/062489, filed on May 16, 2012.

(30) Foreign Application Priority Data

May 16, 2011 (JP) .................. 2011-109217
May 16, 2011 (JP) .................. 2011-109452

(51) Int. Cl.
*H04N 13/317* (2018.01)
*H04N 13/337* (2018.01)
(Continued)

(52) U.S. Cl.
CPC ....... *H04N 13/317* (2018.05); *G02B 27/2214* (2013.01); *G02B 27/26* (2013.01);
(Continued)

(58) Field of Classification Search
CPC .................................................. H04N 13/045
(Continued)

(56) References Cited

U.S. PATENT DOCUMENTS 5,726,703 A 3/1998 Izawa et al.
5,991,074 A 11/1999 Nose et al.
(Continued)

FOREIGN PATENT DOCUMENTS

JP 06-194602 A 7/1994
JP 07-307959 A 11/1995
(Continued)

OTHER PUBLICATIONS

Extended European Search Report for European Application No. 12786395.9, dated Feb. 27, 2015.
(Continued)

*Primary Examiner* — Mohammed S Rahaman
*Assistant Examiner* — Jimmy S Lee
(74) *Attorney, Agent, or Firm* — Birch, Stewart, Kolasch & Birch, LLP

(57) ABSTRACT

This parallax image display device is provided with an image acquiring unit that acquires a right-eye image and a left-eye image used for generating a parallax image enabling a stereoscopic view, an information volume distribution calculator that calculates an information volume distribution of the right-eye image and an information volume distribution of the left-eye image, and a parallax image generator that generates the parallax image from the right-eye image and the left-eye image on the basis of the information volume distribution of the right-eye image and the information volume distribution of the left-eye image.

14 Claims, 14 Drawing Sheets

(51) Int. Cl.
*G03B 35/26* (2006.01)
*G02B 27/26* (2006.01)
*G02B 27/22* (2018.01)
*H04N 13/128* (2018.01)

(52) U.S. Cl.
CPC .......... *G03B 35/26* (2013.01); *H04N 13/128* (2018.05); *H04N 13/337* (2018.05)

(58) Field of Classification Search
USPC .......................................... 348/46
See application file for complete search history.

(56) References Cited

U.S. PATENT DOCUMENTS

| | | | | |
|---|---|---|---|---|
| 6,445,833 | B1* | 9/2002 | Murata | H04N 13/0011 345/419 |
| 2005/0168816 | A1 | 8/2005 | Fukaishi et al. | |
| 2005/0253924 | A1* | 11/2005 | Mashitani | H04N 13/0275 348/42 |
| 2006/0039529 | A1* | 2/2006 | Tsubaki | A61B 6/022 378/41 |
| 2007/0165304 | A1* | 7/2007 | Tomita | G02B 27/225 359/464 |
| 2009/0102916 | A1* | 4/2009 | Saishu | H04N 13/0048 348/54 |
| 2009/0128620 | A1* | 5/2009 | Lipton | H04N 13/0048 348/42 |
| 2010/0045782 | A1* | 2/2010 | Morita | H04N 13/004 348/51 |
| 2011/0159929 | A1* | 6/2011 | Karaoguz | H04N 13/0404 455/566 |

FOREIGN PATENT DOCUMENTS

| | | |
|---|---|---|
| JP | 09-265056 A | 10/1997 |
| JP | 10-51811 A | 2/1998 |
| JP | 10-221643 A | 8/1998 |
| JP | 2005-215326 A | 8/2005 |
| KR | 10-2010-0031126 A | 3/2010 |
| WO | WO 2008/153861 A1 | 12/2008 |

OTHER PUBLICATIONS

Korean Office Action, dated Jul. 22, 2015, for Korean Application No. 10-2013-7030279, with a partial English translation.
English Machine Translation, dated Feb. 20, 1998, for JP-10-51811-A.
English machine translation, dated Jul. 15, 1994, for JP-06-194602-A.
Japanese Office Action, dated Jun. 3, 2014, for Japanese Application No. 2012-112697.
International Preliminary Report on Patentability and an English translation of the Written Opinion of the International Searching Authority (PCT Forms PCT/IB/338, PCT/IB/373 and PCT/ISA/237) for International Application No. PCT/2012/062489, dated Nov. 28, 2013.
Chinese Office Action and Search Report dated Apr. 23, 2015, for Chinese Application No. 201280023213.5 with the partial English translation.

* cited by examiner

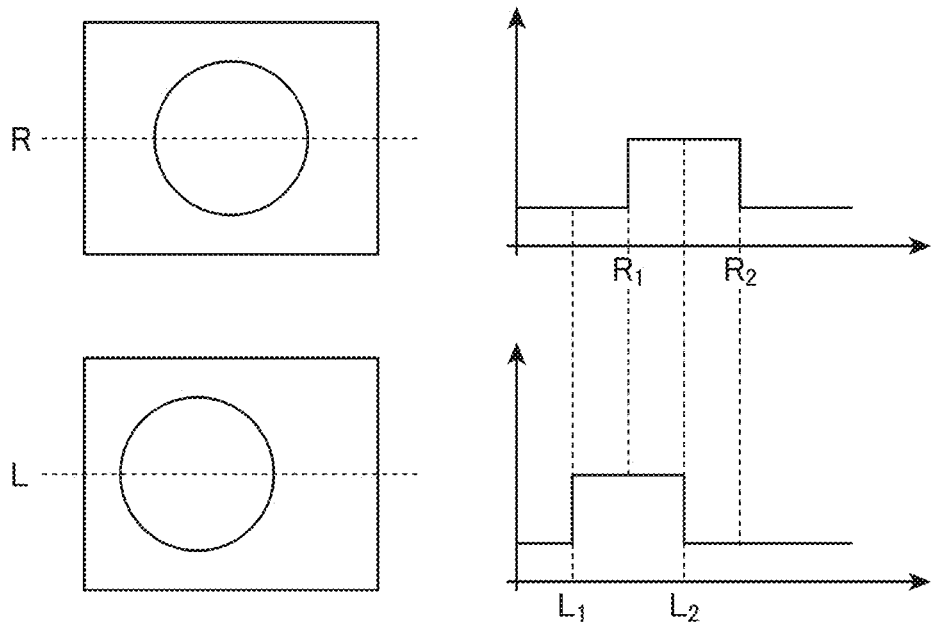
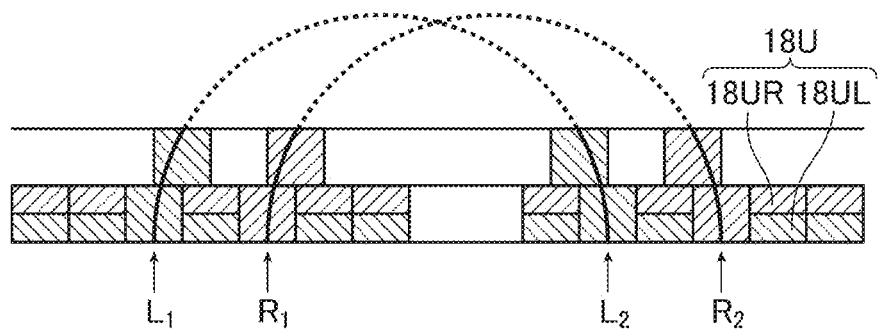

FIG.5

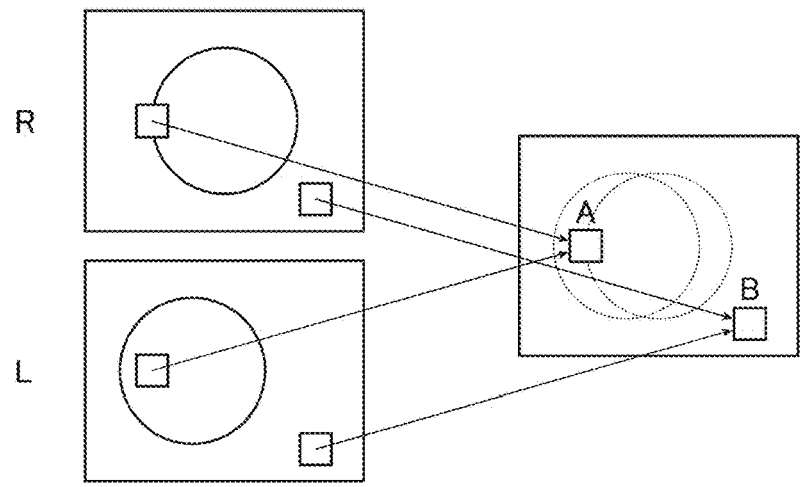

FIG.6

| | USAGE OF COMPARISON RESULT | DISPLAY |
|---|---|---|
| (a) | R > L → R IS USED | |
| | R < L → L IS USED | |
| | R ≈ L → BOTH ARE ARRANGED | |
| (b) | R > L → R IS BROADENED AND L IS NARROWED | |
| | R < L → L IS BROADENED AND R IS NARROWED | |
| | R ≈ L → R AND L HAVE EQUAL AREA | |
| (c) | R > L → R IS BROADENED AND DARKENED AND L IS NARROWED AND BRIGHTENED | |
| | R < L → L IS BROADENED AND DARKENED AND R IS NARROWED AND BRIGHTENED | |
| | R ≈ L → R AND L HAVE EQUAL AREA AND EQUAL BRIGHTNESS | |

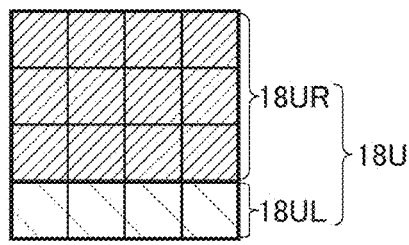
FIG.7A
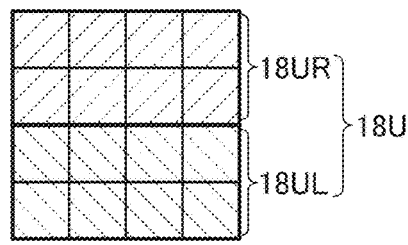
FIG.7B
FIG.8
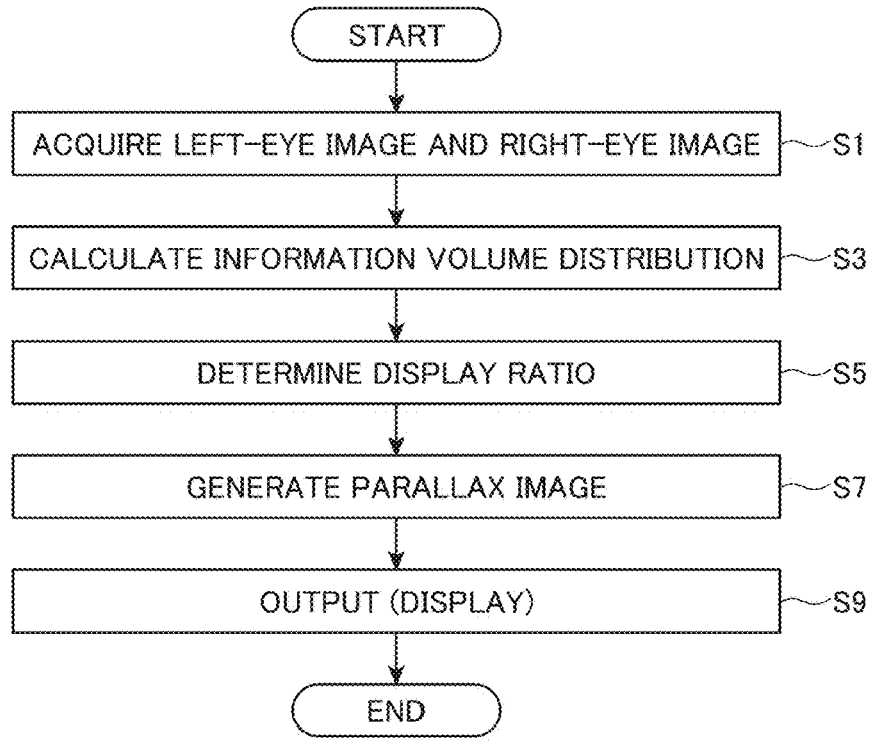
FIG.9A 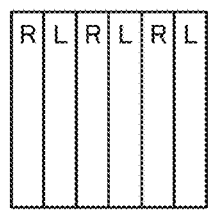 FIG.9B 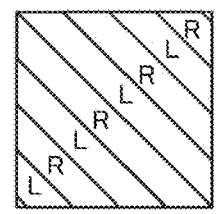 FIG.9C

FIG.13

| | USAGE OF COMPARISON RESULT | DISPLAY |
|---|---|---|
| (a) | R > L → R IS USED | |
| | R < L → L IS USED | |
| | R ≈ L → BOTH ARE ARRANGED | |
| (b) | R > L → R IS BROADENED AND L IS NARROWED | |
| | R < L → L IS BROADENED AND R IS NARROWED | |
| | R ≈ L → R AND L HAVE EQUAL AREA | |
| (c) | R > L → R IS BROADENED AND DARKENED AND L IS NARROWED AND BRIGHTENED | |
| | R < L → L IS BROADENED AND DARKENED AND R IS NARROWED AND BRIGHTENED | |
| | R ≈ L → R AND L HAVE EQUAL AREA AND EQUAL BRIGHTNESS | |

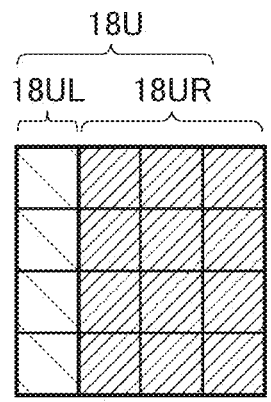

FIG.14A

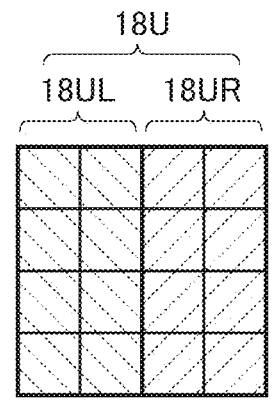

FIG.14B

PARALLAX IMAGE DISPLAY DEVICE, PARALLAX IMAGE GENERATION METHOD, PARALLAX IMAGE PRINT

This application is a Continuation of International Application No. PCT/JP2012/062489, filed on May 16, 2012, which claims priority under 35 U.S.C. 119(a) to Patent Application Nos. 2011-109217 filed on May 16, 2011 in Japan and 2011-109452 filed on May 16, 2011 in Japan, all which are hereby expressly incorporated by reference into the present application.

BACKGROUND OF THE INVENTION

The present invention relates to a parallax image display device, a parallax image generation method, and a parallax image print for performing a stereoscopic view using a right-eye image and a left-eye image.

A parallax image display device or a parallax image generation method has been known hitherto in which a stereoscopic view is carried out by spatially dividing a display screen using a predetermined array such as a staggered pattern array or a stripe pattern array and displaying a parallax image based on a right-eye image and a left-eye image.

JP 07-307959 A discloses a device that spatially divides a display screen using a staggered pattern array or a stripe pattern array to display right and left parallax images. JP 2005-215326 A discloses a device that spatially divides a display screen using a stripe pattern array to display right and left parallax images.

JP 10-221643 A discloses a device that can vertically enlarge a stereoscopic area with less crosstalk by using a parallax barrier having an appropriately-set aperture elongaged in a predetermined direction or a lenticular lens when displaying and observing a three-dimensional image using a polarization control plate.

JP 09-265056 A discloses a device that reduces crosstalk of right and left parallax images and also reduces flickers and moire fringes by switching an image display sent to a display and a display of an aperture pattern sent to a spatial light modulation element in synchronization with each corresponding image or each corresponding scanning line using a parallax barrier system.

In a general parallax image display device, for example, as shown in FIGS. 9A to 9C, a left-eye image and a right-eye image are spatially divided in a stripe shape having the same width, a parallax image is generated so that the right-eye image is displayed in a right-eye region and the left-eye image is displayed in a left-eye region on a parallax image display unit, and the generated parallax image is displayed on the parallax image display unit.

On the parallax image display unit, a polarizing filter having different polarization states for the right-eye image (right-eye region) and the left-eye image (left-eye region) is provided, and the right-eye image is recognized by the right eye and the left-eye image is recognized by the left eye when a viewer views the parallax image displayed on the parallax image display unit through a pair of polarized glasses. Accordingly, the brain can recognize a stereoscopic display from the right-eye image and the left-eye image having parallax.

SUMMARY OF THE INVENTION

Inmost cases, the above stripe pattern composed of the right-eye region and the left-eye region is generally designed so as to have the same pitch as displayed pixels from the viewpoint of resolution, that is, expression ability. However, the stripe width of the stripe pattern and the fineness of pixels expressed therein do not need to correspond to each other in a one-to-one manner, and when finer pixels exist in a coarse stripe pattern, persons can recognize the pixels better.

In addition, it cannot be said to be preferable from the viewpoint of the amount of transinformation of an image that a right-eye image and a left-eye image in a predetermined region are equally allocated to the stripe pattern without judging a degree of importance of image information in each region.

In the case where a display screen is spatially divided using a predetermined array as described in JP 07-307959 A, when similar signal components are included in image signals, interference among spatial signals occurs so that an interference signal (moire) occurs in an observed image, thereby markedly damaging image quality.

As described in JP 2005-215326 A, particularly, in a stripe pattern array, signal components similar to a stripe pattern are often included in an image signal and moire often occurs in an observed image.

In addition, in the stereoscopic display device in which a display screen is spatially divided using a predetermined array and a polarization control plate corresponding thereto is used, an observation height optimal for a stereoscopic view is present in the vertical direction of the screen, and as the screen is viewed from a position higher or lower than the optimal observation height, crosstalk increases more and more. Eventually, an inverse stereoscopic state arises, thus markedly degrading stereoscopic display performance.

In addition, the observer needs to keep an eye at the optimal observation height when observing a stereoscopic view, which increases the observer's burden and causes fatigue.

In the device disclosed in JP 10-221643 A, the aperture width of the parallax barrier is narrow so that the amount of light is decreased and an image is darkened, or the information volume of the image allowed to be displayed is decreased due to the use of a lenticular lens (since the image is stretched by the lenticular lens, the pixel density in a lens power direction is reduced). There is also a problem in that the cost increases by the use of a lenticular lens.

In the device disclosed in JP 09-265056 A, means for performing interlaced scan with the display and the spatial light modulation element corresponding to each other is necessary and thus there is a problem in that the cost greatly increases.

In such a conventional parallax image display device that displays a stereoscopic view using a polarization control plate as described above, when the assumed geometric-optical positional relationship is broken, a crosstalk signal is transferred to the observer.

When the geometric-optical positional relationship is broken to the same degree but the spatial division is set to be finer, the amount of the crosstalk signal becomes large.

That is, in order to suppress the crosstalk signal caused by the broken geometric-optical positional relationship, it is important not to set the spatial division to be unnecessarily fine.

On the other hand, when the spatial division is set to be coarse, information on a parallax image indispensable for allowing the observer to feel a stereoscopic effect cannot be satisfactorily provided to the observer.

An object of the present invention is to provide a parallax image display device, a parallax image generation method, and a parallax image print, which can generate and display a parallax image with high quality without damaging an image information volume of each of a right-eye image and a left-eye image in the parallax image display device that spatially divides a display screen using a predetermined array to display a stereoscopic view.

Another object is to provide a parallax image display device, a parallax image generation method, and a parallax image print, which can display a stereoscopic view with high quality without damaging transmission of image information as well as hardly generating a crosstalk signal by making a division size variable and setting it to the optimal fineness on the basis of local information volumes of an image to be displayed.

In order to solve the foregoing problems, the present invention according to the first aspect provides a parallax image display device comprising: an image acquiring unit adapted to acquire a right-eye image and a left-eye image used for generating a parallax image enabling a stereoscopic view; an information volume distribution calculator adapted to calculate an information volume distribution of the right-eye image and an information volume distribution of the left-eye image; and a parallax image generator adapted to generate the parallax image from the right-eye image and the left-eye image on the basis of the information volume distribution of the right-eye image and the information volume distribution of the left-eye image.

Preferably, the parallax image display device further comprises a first parallax image display unit adapted to have a parallax image display area in which square reference regions each having at least one of a right-eye region for displaying the right-eye image and a left-eye region for displaying the left-eye image are arranged in a grid pattern, and the parallax image generator generates the parallax image by allocating at least one of the right-eye region and the left-eye region in each of the reference regions on the basis of the information volume distribution of the right-eye image and the information volume distribution of the left-eye image, and displaying the right-eye image and the left-eye image.

Preferably, the parallax image generator comprises an information volume comparing section, a reference region allocating section, and an image reflecting section, and the information volume comparing section is adapted to compare an information volume of the right-eye image and an information volume of the left-eye image, both corresponding to a same one of the reference regions, in each of the reference regions on the basis of the information volume distribution of the right-eye image and the information volume distribution of the left-eye image, and output a comparison result; the reference region allocating section is adapted to allocate one of the right-eye region and the left-eye region having a larger information volume to the reference region when one of the right-eye region and the left-eye region is larger in the information volume than the other, and evenly allocate both of the right-eye region and the left-eye region to the reference region when the information volumes thereof are substantially equal to each other on the basis of the comparison result; and the image reflecting section is adapted to generate the parallax image by reflecting the right-eye image and the left-eye image in the right-eye region and the left-eye region, respectively.

Preferably, the parallax image generator comprises an information volume comparing section, a reference region allocating section, and an image reflecting section, and the information volume comparing section is adapted to compare an information volume of the right-eye image and an information volume of the left-eye image, both corresponding to a same one of the reference regions, in each of the reference regions on the basis of the information volume distribution of the right-eye image and the information volume distribution of the left-eye image, and outputs a comparison result; the reference region allocating section is adapted to allocate the right-eye region and the left-eye region with an area corresponding to size of the information volume in each of the reference regions on the basis of the comparison result; and the image reflecting section is adapted to generate the parallax image by reflecting the right-eye image and the left-eye image in the right-eye region and the left-eye region, respectively.

Preferably, the parallax image generator comprises a brightness regulating section, and the brightness regulating section is adapted to increase brightness of the area of the right-eye region or the left-eye region allocated in each of the reference regions as the allocated area is smaller, and decrease brightness of the allocated area as the allocated area is larger.

Preferably, the information volume of each of the reference regions is at least one of an amount of harmonic signal components of the right-eye image or the left-eye image corresponding to each of the reference regions, a value of a maximum frequency of the right-eye image or the left-eye image corresponding to each of the reference regions, a variance value of a brightness distribution of the right-eye image or the left-eye image corresponding to each of the reference regions, and a difference in pixel value between the right-eye image and the left-eye image corresponding to each of the reference regions.

Preferably, the reference region is composed of at least four pixels.

Preferably, the parallax image display device further comprises a polarizing filter that is disposed in front of the first parallax image display unit and that can be operated on the basis of the parallax image so that a polarization state of the left-eye region and a polarization state of the right-eye region are different from each other.

Preferably, the parallax image display device further comprises a two-layer parallax barrier that is disposed in front of the first parallax image display unit and that can be operated on the basis of the parallax image so that only light from the left-eye region is transmitted toward a left eye of an observer and only light from the right-eye region is transmitted toward a right eye of the observer, with the observer being positioned away from the first parallax image display unit by a predetermined interval.

The present invention provides a parallax image generation method comprising steps of: calculating information volume distributions of a right-eye image and a left-eye image which are used to display a stereoscopic view; and generating a parallax image by, in a parallax image display area in which square reference regions are arranged in a grid pattern, allocating at least one of a right-eye region for displaying the right-eye image and a left-eye region for displaying the left-eye image in each of the reference regions on the basis of the information volume distribution of the right-eye image and the information volume distribution of the left-eye image, and reflecting the right-eye image and the left-eye image in the right-eye region and the left-eye region, respectively.

Preferably, the parallax image generation method further comprises steps of: comparing the information volumes in each of the reference regions by each of the reference regions on the basis of the information volume distribution of the right-eye image and the information volume distribution of the left-eye image; and allocating one of the right-eye region and the left-eye region having a larger information volume to the reference region when one of the right-eye region and the left-eye region is larger in the information volume than the other, and evenly allocating both of the right-eye region and the left-eye region to the reference region when the information volumes thereof are substantially equal to each other.

Preferably, the parallax image generation method further comprises steps of: comparing the information volumes in each of the reference regions by each of the reference regions on the basis of the information volume distribution of the right-eye image and the information volume distribution of the left-eye image; and allocating the right-eye region and the left-eye region to each of the reference regions depending on size of the information volumes in the right-eye image and the left-eye image, and evenly allocating both of the right-eye region and the left-eye region to each of the reference regions when both the information volumes are substantially equal to each other.

Preferably, the parallax image generation method further comprises a step of: increasing brightness of an area of the right-eye region or the left-eye region allocated in each of the reference regions as the allocated area is smaller, and decreasing brightness of the allocated area as the allocated area is larger.

The present invention provides a parallax image print, wherein the parallax image generated by the foregoing parallax image generation method is printed.

Preferably, a polarizing film having a polarization state for the right-eye region and a polarization state for the left-eye region which are different from each other is pasted.

Preferably, there is provided a two-layer parallax barrier film that is disposed in front of the parallax image print and that transmits only light from the left-eye region toward a left eye of an observer and transmits only light from the right-eye region toward a right eye of the observer on the basis of the parallax image, with the observer being positioned away from the parallax image print by a predetermined interval.

The present invention according to the second aspect provides the parallax image display device further comprising a second parallax image display unit adapted to have a parallax image display area composed of a right-eye region for displaying the right-eye image and a left-eye region for displaying the left-eye image, wherein the parallax image generator has a parallax image display area classifying section and an area dividing section; wherein the parallax image display area classifying section is adapted to classify the parallax image display area into a plurality of partial display areas on the basis of the information volume distributions; wherein the area dividing section is adapted to divide each of the partial display areas into unit region sets each composed of a right-eye unit region and a left-eye unit region, the unit region sets being different in size and same in shape depending on the classification; and wherein the parallax image generator generates the parallax image by displaying the right-eye image in the right-eye region composed of the right-eye unit regions and displaying the left-eye image in the left-eye region composed of the left-eye unit regions.

Preferably, an information volume of the information volume distribution is at least one of fineness of the image (a variation in pixel value), an amount of harmonic signal components in the image, a value of a maximum frequency in the image, a variance value of a brightness distribution, and a difference in pixel value between the right-eye image and the left-eye image.

Preferably, the area dividing section divides each of the partial display areas into smaller unit region sets when its information volume is larger and divides each of the partial display areas into larger unit region sets when its information volume is smaller.

Preferably, the unit region sets have a stripe pattern.

Preferably, the area dividing section determines a dividing direction of the partial display areas depending on a shape of the partial display areas.

Preferably, the parallax image display device further comprises a polarizing filter that is disposed in front of the second parallax image display unit and that can be operated on the basis of the parallax image so that a polarization state of the left-eye region and a polarization state of the right-eye region are different from each other.

Preferably, there is provided a parallax barrier that is disposed in front of the second parallax image display unit and that transmits only light from the left-eye region toward a left eye of an observer and transmits only light from the right-eye region toward a right eye of the observer on the basis of the parallax image, with the observer being positioned away from the second parallax image display unit by a predetermined interval.

The present invention provides a parallax image generation method that generates a parallax image by calculating information volume distributions of a right-eye image and a left-eye image which are used for generating a parallax image enabling a stereoscopic view; classifying a parallax image display area for displaying the parallax image into a plurality of partial display areas on the basis of the information volume distributions; dividing each of the partial display areas into unit region sets each composed of a right-eye unit region and a left-eye unit region, the unit region sets being different in size and same in shape depending on the classification; and displaying the right-eye image in the right-eye unit region and the left-eye image in the left-eye unit region.

Preferably, an information volume of the information volume distribution is at least one of fineness of the image (a variation in pixel value), an amount of harmonic signal components in the image, a value of a maximum frequency in the image, a variance value of a brightness distribution, and a difference between the right-eye image and the left-eye image.

Preferably, each of the partial display areas is divided into unit region sets having a smaller size as the information volume is larger, and into unit region sets having a larger size as the information volume is smaller.

Preferably, the unit region sets have a stripe pattern.

Preferably, a dividing direction of the partial display areas is determined depending on a shape of the partial display areas.

The present invention provides a parallax image print, wherein the parallax image generated by the foregoing parallax image generation method is printed.

Preferably, a polarizing film having a polarization state for the right-eye region and a polarization state for the left-eye region which are different from each other is pasted.

Preferably, there is provided a parallax barrier film that is disposed in front of the parallax image print and that transmits only light from the left-eye region toward a left eye of an observer and transmits only light from the right-eye region toward a right eye of the observer on the basis of the parallax image, with the observer being positioned away from the parallax image print by a predetermined interval.

According to the first aspect of the present invention, it is possible to provide a parallax image display device, a parallax image generation method, and a parallax image print, which can generate and display a parallax image with high quality and with the maximum transinformation of a right-eye image and a left-eye image.

According to the second aspect of the present invention, it is possible to provide a parallax image with high quality in which degradation in image quality due to crosstalk is hardly felt. Since the parallax image does not require electrical drive, the parallax image can be applied to a method of parallax image display such as prints or photograph prints.

BRIEF DESCRIPTION OF THE DRAWINGS

FIG. 3A shows an example of a right-eye image and a left-eye image and FIG. 3B is a graph in which the horizontal axis represents the dashed-line positions shown in FIG. 3A and the vertical axis represents the information volumes of the right-eye image and the left-eye image.

FIG. 4 is an explanatory diagram illustrating a space-division parallax image display composed of the right-eye image and the left-eye image shown in FIG. 3.

FIG. 5 is an explanatory diagram illustrating a parallax image generation method according to the first aspect of the present invention.

FIG. 6 is an explanatory diagram illustrating the correspondence between each comparison result of information volume distributions and a reference region of the parallax image display according to the first aspect of the present invention.

FIGS. 7A and 7B are detailed explanatory diagrams each illustrating an example of the reference region of the parallax image display according to the first aspect of the present invention.

FIG. 8 is a flowchart illustrating a process flow of generating a parallax image according to the first aspect of the present invention.

FIGS. 9A to 9C are explanatory diagrams illustrating general parallax images.

FIG. 13 is an explanatory diagram illustrating the correspondence between each comparison result of information volume distributions and a reference region when the reference region is divided in the vertical direction.

FIGS. 14A and 14B are detailed explanatory diagrams each illustrating a case where the reference region shown in FIG. 7 is divided in the vertical direction.

DETAILED DESCRIPTION OF THE INVENTION

A parallax image display device, a parallax image generation method, and a parallax image print according to the present invention will be described below in detail based on preferred examples shown in the accompanying drawings.

First Aspect

<Parallax Image Display Device>

Figure 1:
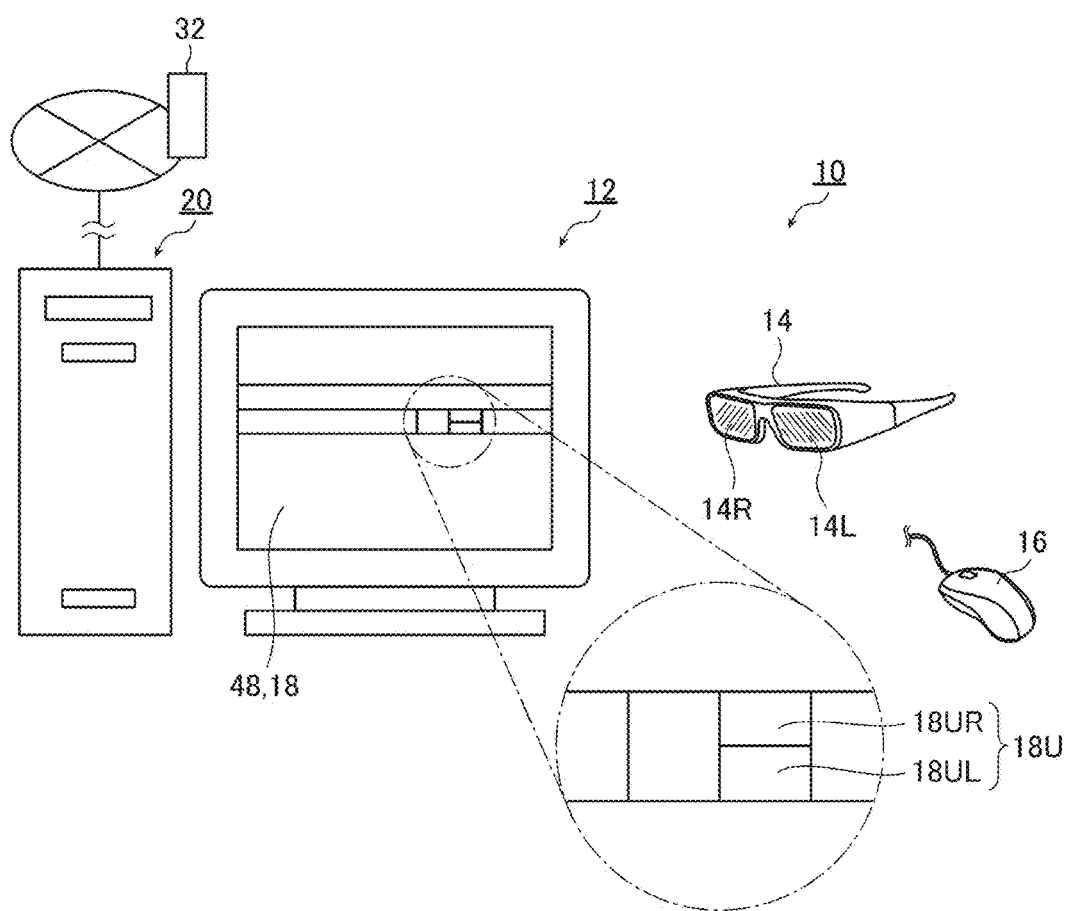
FIG. 1 is an appearance diagram illustrating an example of a parallax image display device according to a first aspect of the present invention.

FIG. 1 is an appearance diagram illustrating an embodiment of a configuration of a parallax image display device according to a first aspect of the present invention. As shown in FIG. 1, a parallax image display device 10 according to the present invention includes a first parallax image display unit 12, a pair of polarized glasses 14, an operation input unit 16, a console 20, and an image server 32.

As shown in FIG. 1, the first parallax image display unit 12 that displays a space-division parallax image has a parallax image display area 18 composed of square reference regions 18U. Each reference region 18U has at least one of a right-eye unit region 18UR for displaying a right-eye image and a left-eye unit region 18UL for displaying a left-eye image.

Thus, the first parallax image display unit 12 has the parallax image display area 18 including a right-eye region (right-eye image display area) 18R composed of the right-eye unit regions 18UR and a left-eye region (left-eye image display area) 18L composed of the left-eye unit regions 18UL, that is, the parallax image display area 18 composed of the reference regions 18U.

The first parallax image display unit 12 also includes a polarizing filter 48 in which a polarization state of an arbitrary region can be operated, and the polarizing filter 48 is operated so that the polarization states for a region (right-eye region 18R) in which a right-eye image is displayed and a region (left-eye region 18L) in which a left-eye image is displayed are different from each other in the parallax image display area 18 on the first parallax image display unit 12.

As a specific example of the polarizing filter 48, a liquid crystal panel capable of independently operating the polarization state of a parallax image, separately from a liquid crystal display for displaying a parallax image, or the like can be considered.

The polarizing filter utilizing a liquid crystal panel is disposed in front of the liquid crystal display for displaying a parallax image, and its polarization states for the left-eye region 18L and the right-eye region 18R of a parallax image can be operated using information on the parallax image.

By viewing the parallax image displayed on the first parallax image display unit 12 using the polarized glasses 14, an observer recognizes only the left-eye image with the left eye through a polarizing lens 14L and recognizes only the right-eye image with the right eye through a polarizing lens 14R.

Accordingly, the observer's brain can perform a stereoscopic view on the basis of the left-eye image recognized with the left eye and the right-eye image recognized with the right eye.

The operation input unit 16 gives various instructions to a control unit 26 to be described later of the console 20. Examples of the instructions include an instruction to acquire the right-eye image and the left-eye image from the image server 32, an instruction to switch a stereoscopic display and a two-dimensional display on the first parallax image display unit 12, and an instruction to store the generated parallax image in the image server 32.

<Console>

Figure 2:
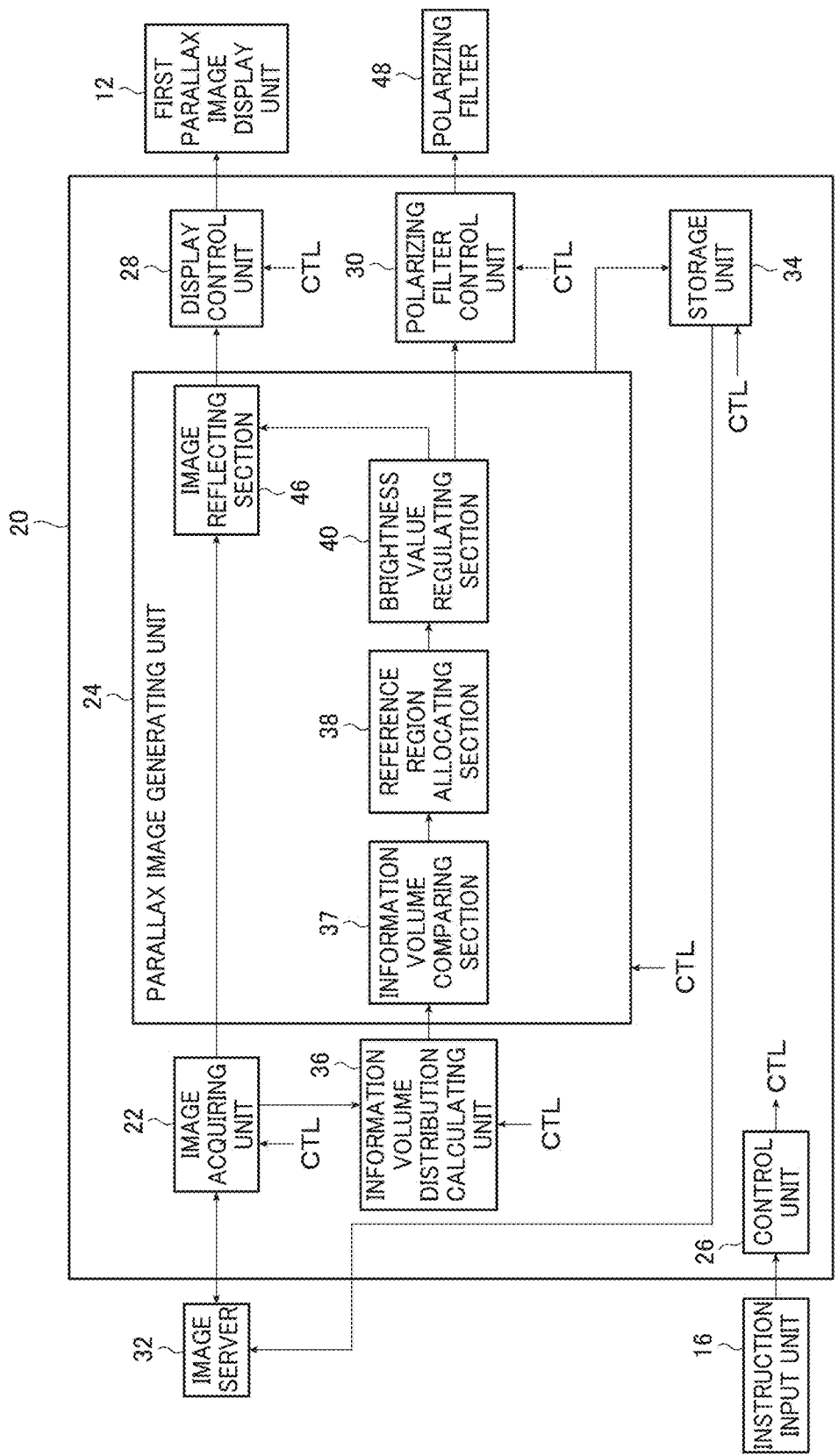
FIG. 2 is a block diagram illustrating a detailed configuration of the example of the parallax image display device shown in FIG. 1.

FIG. 2 is a block diagram illustrating a detailed configuration of the parallax image display device according to the present invention and in particular, shows the detailed configuration of the console 20.

As shown in FIG. 2, the above console 20 includes an image acquiring unit 22, a parallax image generating unit 24, the control unit 26, a display control unit 28, a polarizing filter control unit 30, a storage unit 34, and an information volume distribution calculating unit 36. The parallax image generating unit 24 includes an information volume comparing section 37, a reference region allocating section 38, a brightness value regulating section 40, and an image reflecting section 46.

Specifically, the console 20 is constituted of a computer including a CPU (Central Processing Unit), a RAM (main storage device), a hard disk, and the like. Actually, the CPU (Central Processing Unit), the RAM (main storage device), the hard disk, and the like work together to constitute the foregoing units and sections of the console 20.

The image acquiring unit 22 is controlled by the control unit 26 in accordance with an instruction from the instruction input unit 16 and acquires a right-eye image and a left-eye image which are stored in the image server 32 to enable a stereoscopic display.

The information volume distribution calculating unit 36 calculates respective information volume distributions of the right-eye image and the left-eye image acquired by the image acquiring unit 22 and outputs the calculated information volume distribution of the right-eye image and the calculated information volume distribution of the left-eye image to the parallax image generating unit 24.

Here, examples of the information volume include (1) an amount of harmonic signal components of an image, (2) a value of the maximum frequency of an image, (3) a variance value of a brightness distribution of an image in a local region, and (4) a difference in pixel value between original right and left images.

The parallax image generating unit 24 reflects the right-eye image and the left-eye image in the right-eye region 18R and the left-eye region 18L as described above, and generates the parallax image.

First, the parallax image generating unit 24 compares the information volume of the right-eye image and the information volume of the left-eye image in each of the reference regions 18U constituting the parallax image display area 18 through the information volume comparing section 37.

The reference region 18U may be constituted of, for example, 16 pixels of 4×4 or 36 pixels of 6×6. The size of the reference region may be changed depending on the size (the number of pixels) of a display image or the size (resolution) of the first parallax image display unit 12 having the parallax image display area 18 (corresponding to the parallax image display area 18 in a one-to-one manner).

In the respective square reference regions 18U constituting the parallax image display area 18, the information volumes in the reference region 18U are compared on the basis of the information volume distribution of the right-eye image and the information volume distribution of the left-eye image calculated by the information volume distribution calculating unit 36.

The reference region allocating section 38 allocates the right-eye unit region 18UR and the left-eye unit region 18UL in the reference region 18 on the basis of the size of the information volumes.

Regarding the allocation, for example, of the right-eye unit region 18UR and the left-eye unit region 18UL, either one having a larger information volume may be allocated, or both the right-eye unit region 18UR and the left-eye unit region 18UL may be evenly allocated when the information volumes are nearly equal to each other. The region areas of the right-eye unit region 18UR and the left-eye unit region 18UL may be changed and allocated depending on the size of the information volumes.

For example, when the reference region 18U has 16 pixels of 4×4, 12 pixels of 4×3 and 4 pixels of 4×1 may be allocated for the right-eye unit region 18UR and the left-eye unit region 18UL, respectively, depending on the size of the information volumes.

When the region areas of the right-eye unit region 18UR and the left-eye unit region 18UL in a reference region 18U are different from each other as described above, the brightness value may be regulated depending on the region areas.

As the region area becomes smaller, the region looks darker unless the brightness value is changed and thus it is necessary to raise the brightness value. In contrast, as the region area becomes larger, it is necessary to lower the brightness value.

The image reflecting section 46 generates a parallax image by reflecting the right-eye image and the left-eye image so that the right-eye image is displayed in the right-eye unit region 18UR and the left-eye image is displayed in the left-eye unit region 18UL in each reference region 18U.

The control unit 26 receives an instruction from the instruction input unit 16 and controls operations of the respective units of the parallax image display device 10. As described above, the image acquiring unit 22 is caused to acquire the left-eye image and the right-eye image, the parallax image generating unit 24 is caused to generate a parallax image, the first parallax image display unit 12 is caused to display the parallax image through the display control unit 28 to be described later, and the polarizing filter control unit 30 to be described later is caused to control the polarization state of the polarizing filter 48 disposed on the unshown first parallax image display unit 12 in accordance with the parallax image. The generated parallax image may be stored in the storage unit 34 to be described later, or the generated parallax image may be stored in an image server through the storage unit 34.

The display control unit 28 two-dimensionally displays the left-eye image and the right-eye image on the first parallax image display unit 12 in response to an instruction from the instruction input unit 16, in addition to displaying the parallax image on the first parallax image display unit 12 as described above.

The polarizing filter control unit 30 controls the polarizing filter 48 so that different polarization states are separately applied to the left-eye region 18L and the right-eye region 18R on the basis of information on the parallax image from the parallax image generating unit 24.

The storage unit 34 temporarily stores the parallax image generated by the parallax image generating unit 24 along with the right-eye image and the left-eye image and stores image data of these images in the image server 32 in response to an instruction from the instruction input unit 16.

The console 20 generates the parallax image on the basis of the right-eye image and the left-eye image enabling a stereoscopic view as described above. The generated parallax image is displayed on the first parallax image display unit 12 having the parallax image display area 18 composed of the left-eye region 18L and the right-eye region 18R, and is stored in the image server 32 if necessary.

The image server 32 suffices if it can store the left-eye image and the right-eye image enabling a stereoscopic view as image data, and various recording media in which the image data of the right-eye image and the left-eye image is stored and recording medium reading device may be used instead of the image server.

The configuration of the parallax image display device 10 according to the first aspect of the present invention is as explained above.

The operation of the parallax image display device 10 according to the first aspect of the present invention will be described below in brief.

Upon receiving an instruction from the instruction input unit 16, the image acquiring unit 22 acquires the right-eye image R and the left-eye image L enabling a stereoscopic view as shown in FIG. 3A. The acquired right-eye image R and the acquired left-eye image L are output to the information volume distribution calculating unit 36, so that the information volume distribution of the right-eye image R and the information volume distribution of the left-eye image L are calculated. For example, (1) an amount of harmonic signal components of an image described above is used as the information volume.

The information volume distribution of the right-eye image R and the information volume distribution of the left-eye image L calculated by the information volume distribution calculating unit 36 are compared in terms of the information volume for each corresponding reference region 18U by the information volume comparing section 37 of the parallax image generating unit 24 as shown in FIG. 4, and the comparison result is output.

As the comparison result, results of which is larger between the information volume of the right-eye image R and the information volume of the left-eye image L in the corresponding reference region 18U, how much the information volume is larger, and the like are output.

The reference region allocating section 38 allocates the right-eye unit region 18UR and the left-eye unit region 18UL to the reference region 18U on the basis of the foregoing comparison result as shown in FIG. 5.

In the allocation of the right-eye unit region 18UR and the left-eye unit region 18UL, as shown in FIG. 6(*a*), either one of the right-eye unit region 18UR and the left-eye unit region 18UL may be allocated, or both may be evenly allocated when the information volumes are nearly equal to each other.

In addition, as shown in FIG. 6(*b*), the region areas of the right-eye unit region 18UR and the left-eye unit region 18UL may be changed and allocated depending on the information volumes.

Moreover, as shown in FIG. 6(*c*), the brightness value may be regulated depending on the allocated region areas using the brightness value regulating section 40. When the region area is small, the brightness value is regulated to be large (bright). When the region area is large, the brightness value is regulated to be small (dark).

The image reflecting section 46 generates a parallax image by reflecting the right-eye image R in the right-eye unit region 18UR and reflecting the left-eye image L in the left-eye unit region 18UL.

As described above, the parallax image generated by the parallax image generating unit 24 may be displayed on the first parallax image display unit 12 through the display control unit 28, may be temporarily stored in the storage unit 34, and may be stored in the image server 32 in response to an instruction from the instruction input unit 16.

The polarizing filter control unit 30 acquires information on the parallax image display area 18 in which the right-eye unit region 18UR and the left-eye unit region 18UL are allocated in each reference region and the brightness value is regulated, and controls the polarizing filter 48.

The polarizing filter 48 is controlled so that the polarization states for the right-eye region 18R and the left-eye region 18L of the parallax image display area 18 are different from each other, and transmits light of different polarization states from a filter region corresponding to the right-eye region 18R and a filter region corresponding to the left-eye region 18L.

Accordingly, an observer can perform a stereoscopic view by observing the parallax image displayed on the first parallax image display unit 12 with the polarized glasses 14 by the use of the parallax image display device 10 according to the present invention.

The operation of the parallax image display device 10 according to the first aspect of the present invention is as explained above.

<Parallax Image Generation Method>

A parallax image generation method according to the first aspect of the present invention will be described below. In the parallax image display device 10 according to the present invention, the parallax image generating unit 24 generates a parallax image using the parallax image generation method according to the present invention and the first parallax image display unit 12 displays the parallax image.

Graphs obtained by, in a right-eye image R and a left-eye image L captured with different viewpoints as shown in FIG. 3A so as to enable a stereoscopic view, measuring the pixel values (information volume) of the dotted portions of the right-eye image R and the left-eye image L are shown in FIG. 3B.

It can be seen from FIGS. 3A and 3B that edge portions of the circles on the dotted lines indicated by the right-eye image R and the left-eye image L are R1 and R2, and L1 and L2.

In the parallax image generation method according to the first aspect of the present invention, a parallax image is generated so as not to damage image information of the right-eye image and the left-eye image as much as possible. Accordingly, when the dotted portions of the right-eye image R and the left-eye image L shown in FIG. 3A are focused to consider the parallax image, the right-eye image R and the left-eye image L have only to be emphasized at their edge portions, that is, at R1 and R2, and L1 and L2 shown in FIG. 3B.

Specifically, as shown in FIG. 4, it is preferable that the priority be given to information on the right-eye image R in the regions in which the edge portions R1 and R2 of the right-eye image R are displayed so that the right-eye image R is preferentially displayed in the reference region 18U. Also, in the parallax image, it is preferable that the priority be given to information on the left-eye image L in the regions in which the edge portions L1 and L2 of the left-eye image L are displayed so that the left-eye image L is preferentially displayed in the reference region 18U.

More specifically, the image information volume distributions of the right-eye image R and the left-eye image L are calculated by the information volume distribution calculating section 36, the information volumes of the right-eye image R and the left-eye image L in the same region (the same reference region 18U) are calculated from the calculated information volume distributions as shown in FIG. 5, the information volumes are compared by the information volume comparing section 37, and the image having a larger information volume is preferentially displayed.

As described above, examples of the information volume include (1) an amount of harmonic signal components of an image, (2) a value of the maximum frequency of an image, (3) a variance value of a brightness distribution of an image in a local region, and (4) a difference in pixel value between original right and left images.

As a usage of the comparison result of the information volumes, for example, as shown in FIG. 6(a), the right-eye image R and the left-eye image L in the same reference region 18U may be compared to employ the image having a larger information volume, and either one of the right-eye image R and the left-eye image L may be displayed as the parallax image of the reference region 18U. Alternatively, when the information volumes are substantially equal to each other, both the images may be displayed side by side to have the same area in the reference region 18U.

In the simple display as shown in FIG. 6(a), image information of either one image is not displayed at all in a certain region, which may lead to unfavorable cases.

Therefore, as a usage of the comparison result of the information volumes, as shown in FIG. 6(b), the allocated area of the image having a larger information volume may be set to be larger and the allocated area of the image having a smaller information volume may be set to be smaller in the reference region 18U by the reference region allocating section 38. For example, of the right-eye image R and the left-eye image L, if the information volume of the right-eye image R is larger, the allocated area of the left-eye image L is set to be larger accordingly.

In the case of FIG. 6(b), a case where the image information is not reflected in the parallax image at all as in FIG. 6(a) would not occur, but since the allocated area of one of the images is made smaller, when the one of the images is viewed with the polarized glasses, there arises a portion in which the image is displayed to be dark.

Therefore, even when the allocated area is small, in order to prevent the image from being darkened thereby, it is necessary to regulate the parallax image.

Therefore, as a usage of the comparison result of the information volumes, as shown in FIG. 6(c), when the allocated area in the reference region 18U of the parallax image is made smaller based on the comparison result of the information volumes, the brightness (brightness value) is raised by the corresponding amount by the brightness value regulating section 40, and in contrast, when the allocated area is made larger, the brightness is lowered.

By allocating the right-eye image R and the left-eye image L in the reference region 18U using the comparison result of the information volumes as shown in FIG. 6(c), the amounts of light of the right-eye image and the left-eye image in each reference region 18U (the amounts of light of the right-eye unit region 18UR and the left-eye unit region 18UL in the reference region 18U) can be made uniform, and even when the right-eye image R and the left-eye image L are viewed as a whole, the amounts of light thereof can be made uniform to the same degree.

Therefore, by generating the parallax image with the allocated area and the brightness being correlated in each reference region 18U, a case where either one of the right-eye image R and the left-eye image L is locally or wholly darkened more than necessary can be avoided, and thus it is possible to perform a balanced stereoscopic display.

<Specific Example of Reference Region>

In the case where the method shown in FIG. 6(c) is used as a usage of the comparison result of the information volumes, when comparing the information volumes of the right-eye image R and the left-eye image L by the information volume comparing section 37 as to the reference region 18U indicated by A in FIG. 5, the right-eye image R in which an edge portion of the circular figure is included in the reference region 18U is given priority.

Figure 12:
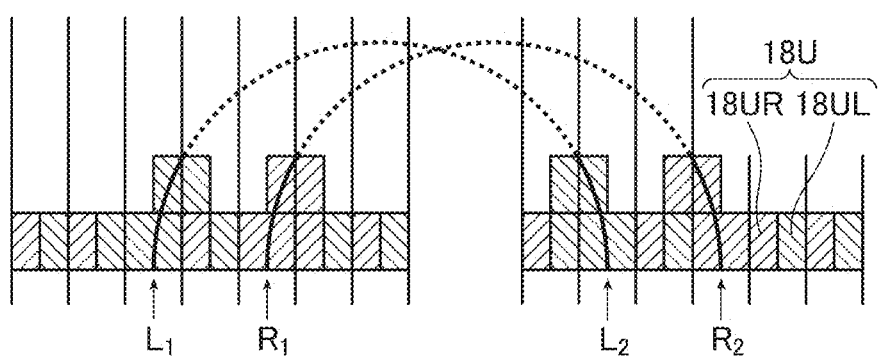
FIG. 12 is a diagram illustrating a case where a stripe direction is set as the vertical direction in the space-division parallax image display composed of the right-eye image and the left-eye image shown in FIG. 4.

Therefore, this case corresponds to the case of R>L in FIG. 6(c), and for example, when the reference region 18U includes 16 pixels of 4×4 as shown in FIG. 7A, 12 pixels are allocated to the right-eye unit region 18UR so as to display the right-eye image R having a larger information volume and 4 pixels are allocated to the left-eye unit region 18UL so as to display the left-eye image L having a smaller information volume, by the reference region allocating section 38.

The edge portion of the circular figure which is the right-eye image R is displayed with a brightness value slightly lowered by the brightness value regulating section 40 in the right-eye unit region 18UR, and the left-eye image L is displayed with a raised brightness value in the left-eye unit region 18UL.

In addition, in the case where the method shown in FIG. 6(c) is used, when comparing the information volumes of the right-eye image R and the left-eye image L, nothing is displayed in both the images as to the reference region 18U indicated by B in FIG. 5, and thus the right-eye image R and the left-eye image L are equally allocated.

Therefore, this case corresponds to the case of R≈L in FIG. 6(c), and for example, when the reference region 18U includes 16 pixels of 4×4 as shown in FIG. 7B, the information volumes of the right-eye image R and the left-eye image L are substantially equal to each other and thus 8 pixels are allocated to the right-eye unit region 18UR while 8 pixels are allocated to the left-eye unit region 18UL, evenly.

Subsequently, by the image reflecting section 46, the right-eye image R is reflected in the right-eye unit region 18UR and the left-eye image L is reflected in the left-eye unit region 18UL without any change to generate a parallax image. The generated parallax image is displayed on the first parallax image display unit 12.

<Flow of Parallax Image Generation>

Next, a parallax image generation method in the parallax image generating unit 24 will be described below in brief with reference to the flowchart shown in FIG. 8.

The parallax image display device 10 acquires a right-eye image R and a left-eye image L captured for a stereoscopic display from an unshown image server or the like through the parallax image generating unit 24 (step S1).

The parallax image generating unit 24 calculates respective information volume distributions of the right-eye image R and the left-eye image L (step S3).

The information volume distributions are calculated using, for example, at least one of (1) an amount of harmonic signal components of an image, (2) a value of the maximum frequency of an image, (3) a variance value of a brightness distribution of an image in a local region, and (4) a difference in pixel value between original right and left images, as the information volume.

The parallax image generating unit 24 divides a parallax image display area into, for example, square local areas, and performs comparison in terms of any one of information volumes of (1) to (4) in each of the local areas.

As shown in FIG. 6(c), a display ratio of the right-eye image R to the left-eye image L in the reference region 18U is determined on the basis of the comparison result (step S5).

For example, as shown in FIG. 7A, when the information volume of the right-eye image R is larger in a local area including 16 pixels of 4×4, for example, the right-eye image R may be displayed in ¾ from the top of the local area and the left-eye image L may be displayed in ¼ from the bottom. In this case, the left-eye image L in ¼ from the bottom is displayed with a raised brightness value and the right-eye image R in ¾ from the top is displayed with a lowered brightness value.

The information volumes are compared for all the reference regions 18U of the parallax image display area 18 and a parallax image is generated (step S7). The displayed space-division parallax image can be said to be a parallax image in which the information volumes of the right-eye image and the left-eye image are maintained as much as possible.

The parallax image generated by the parallax image generating unit 24 is displayed on the first parallax image display unit 12 having the parallax image display area 18 (the parallax image display area 18 corresponds to the display screen in a one-to-one manner) (step S9).

The parallax image may be output by an output device such as a printer as well as being displayed on the first parallax image display unit 12. This is because the present invention relates to a space-division stereoscopic display and does not require electrical drive.

<Parallax Image Print>

As described above, the parallax image generated using the parallax image generation method may be output as a parallax image print by printing the parallax image on a paper sheet through an unshown printer or the like as well as being displayed on the first parallax image display unit 12 of the parallax image display device 10.

In this case, after the parallax image is printed on a paper sheet as a parallax image print, a polarizing film corresponding to the left-eye region 18L and the right-eye region 18R of the parallax image is pasted on the printed parallax image.

In this case, after the parallax image is printed on a paper sheet as a parallax image print, a polarizing film corresponding to the left-eye region 18L and the right-eye region 18R of the parallax image is pasted on the printed parallax image.

For example, an elliptical polarizing plate described in JP 2009-193014 A can be used as the polarizing film.

Since the elliptical polarizing plate can be manufactured with an arbitrarily-changed polarization pattern, the elliptical polarizing plate of which the polarization pattern corresponds to the left-eye region 18L and the right-eye region 18R is manufactured and pasted on the parallax image as the polarizing film.

By viewing through the polarized glasses 14 the parallax image print on which the polarizing film is pasted, an observer recognizes only the right-eye image with the right eye through the polarizing lens 14R and recognizes only the left-eye image with the left eye through the polarizing lens 14L, and accordingly, the observer can perform a stereoscopic view on the basis thereof as described above.

As described above, when the parallax image is observed using polarization, the left-eye image is recognized with the observer's left eye and the right-eye image is recognized with the observer's right eye even by setting the dividing direction of the stripe pattern of the parallax image to any direction such as a vertical direction and an oblique direction in addition to the lateral (horizontal) direction shown in FIGS. 1, 4, 6, and 7. Accordingly, the observer can perform a stereoscopic display.

<Parallax Barrier System>

In the parallax image display device 10 according to the first aspect of the present invention, the first parallax image display unit 12 may include a two-layer parallax barrier 49 to be described later instead of the polarizing filter 48. In this case, the parallax image is limited to a parallax image which is divided in a stripe pattern in the vertical direction (the direction perpendicular to the arrangement direction of the observer's eyes) shown in FIG. 9B, and the console 20 includes a parallax barrier control unit 31 that controls the two-layer parallax barrier 49 in accordance with the parallax image (parallax image display area 18) generated by the parallax image generating unit 24, instead of the polarizing filter control unit 30.

The polarized glasses 14 are not necessary and a stereoscopic view can be performed with naked eyes.

A switch liquid crystal that can electrically switch the presence or absence of transmission of light in an arbitrary region on a pixel basis, or the like can be considered as the parallax barrier, and the two-layer parallax barrier 49 is constituted by stacking the switch liquid crystal in two layers.

The parallax barrier control unit 31 controls the two-layer parallax barrier 49 by electrically controlling the two-layered switch liquid crystals, separately.

Figure 10A:
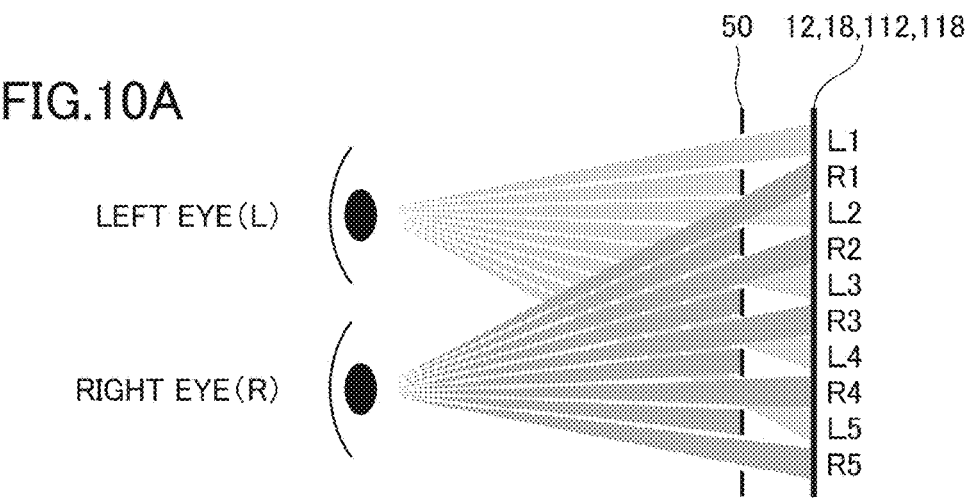
FIG. 10A is an explanatory diagram illustrating a conventional parallax barrier.

A conventional parallax barrier 50 is disposed in front of the first parallax image display unit 12 with a certain distance, and the right-eye image is observed with the right eye and the left-eye image is observed with the left eye as shown in FIG. 10A. Accordingly, the observer can perform a stereoscopic view using the right-eye image and the left-eye image.

In this case, as shown in FIG. 10A, the display area (information volume) of the right-eye image and the display area of the left-eye image are substantially equal to each other.

Figure 10B:
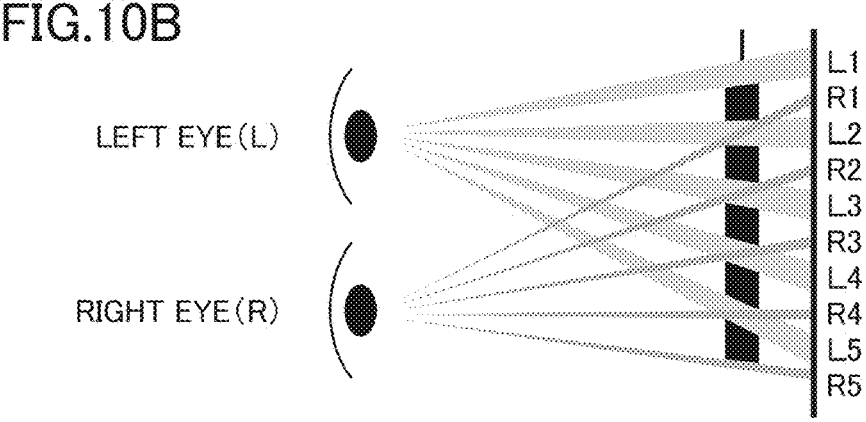
FIG. 10B is an explanatory diagram illustrating a parallax barrier of which the thickness and the shape are changed to provide a difference in display area between a right-eye image and a left-eye image.

When a difference is provided between the display areas of the right-eye image and the left-eye image to be observed, when the interval of the spatial division of the parallax image is changed by each predetermined area, when the shapes of the right-eye region 18R and the left-eye region 18L to be observed are made different from each other, and in other cases, the thickness or the shape of the parallax barrier needs to be changed as shown in FIG. 10B.

Figure 10C:
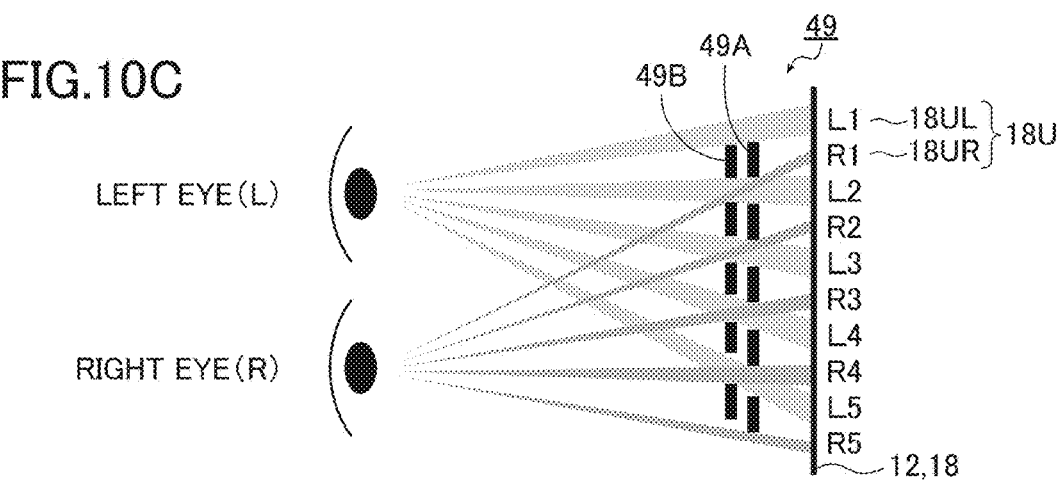
FIG. 10C is an explanatory diagram illustrating a two-layer parallax barrier according to the present invention.

By combining the conventional parallax barriers 50 shown in FIG. 10A in two layers, as shown in FIG. 10C, the two-layer parallax barrier 49 according to the present invention can exhibit the same effects as the parallax barrier having complex thickness and shape as shown in FIG. 10B, and a parallax barrier having an arbitrary shape can be formed depending on the parallax image (parallax image display area 18).

As shown in FIG. 10C, the two-layer parallax barrier 49 comprises a first layer 49A and a second layer 49B. For example, by limiting light from some regions R1 to R5 of the right-eye image (the right-eye unit regions 18UR) by the first layer 49A and the second layer 49B, the display areas (areas to be observed by an observer) of the right-eye unit region 18UR and the left-eye unit region 18UL in each reference region 18U in the present invention can be arbitrarily changed.

Figure 11:
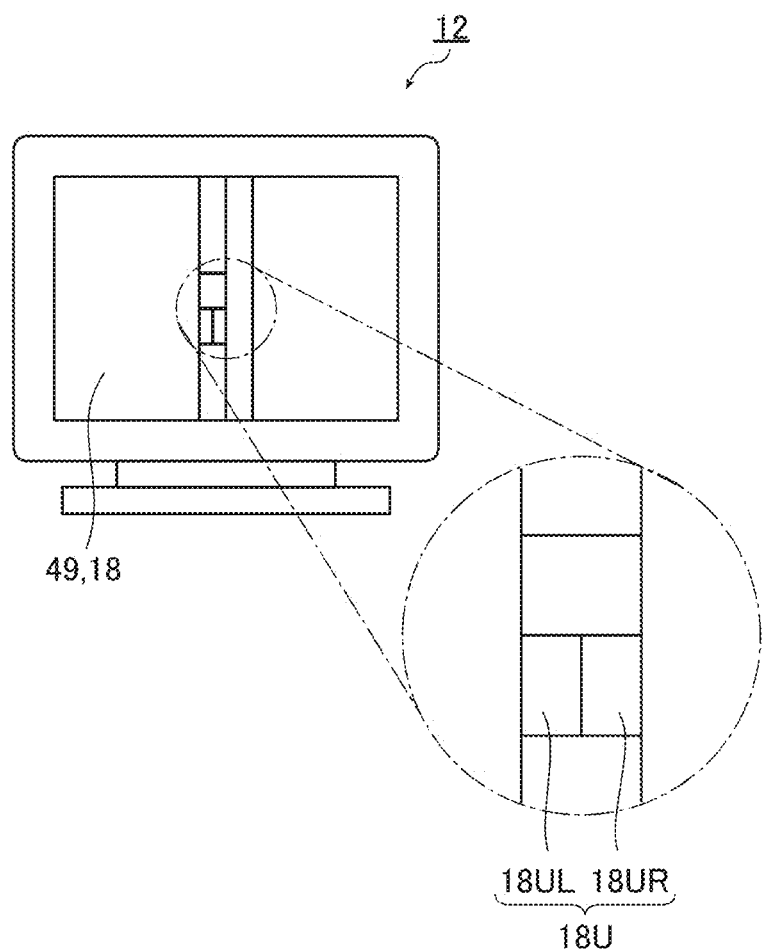
FIG. 11 is an appearance diagram illustrating an example of a first parallax image display unit when a parallax barrier system is used in the parallax image display device shown in FIG. 1.

As shown in FIG. 11, the parallax image display device 10 according to the present invention has the two-layer parallax barrier 49 in front of the first parallax image display unit 12, and when the parallax image divided in the vertical direction in a stripe pattern is generated by the parallax image generating unit 24, the two-layer parallax barrier 49 is operated so that an observer positioned away from the first parallax image display unit 12 by a predetermined distance can observe the right-eye image of the parallax image with the observer's right eye and the left-eye image of the parallax image with the observer's left eye.

Thus, the observer can perform a naked-eye stereoscopic view on the basis of the right-eye image and the left-eye image by recognizing the right-eye image with the right eye and the left-eye image with the left eye.

In the parallax barrier type stereoscopic display device, since the parallax image is limited to have the stripe pattern in the vertical direction as described above, not the parallax image divided in a stripe pattern in the horizontal direction as shown in FIG. 4 but the parallax image divided in a stripe pattern in the vertical direction as shown in FIG. 12 is generated. By comparison of the information volumes in the parallax image, the reference regions are classified as shown in FIG. 13 which corresponds to FIG. 6, and are specifically displayed as shown in FIGS. 14A and 14B corresponding to FIGS. 7A and 7B.

A difference in area between the right-eye unit region 18UR and the left-eye unit region 18UL in the reference region 18U shown in FIG. 14A is generated with the use of the two-layer parallax barrier 49.

Also in the above-mentioned parallax image print, a two-layer parallax barrier film can be used instead of the polarizing film. Similarly to the above-mentioned two-layer parallax barrier, the two-layer parallax barrier film is constituted by stacking two parallax barrier films. In this case, similarly to the above, the polarized glasses 14 are not necessary and it is possible to perform a stereoscopic view with naked eyes.

As the parallax barrier film, for example, a combination of a non-light-transmitting film not transmitting light and a light-transmitting film transmitting light, which do not require electrical drive, can be considered.

By installing (pasting) the two-layer parallax barrier film constituted in accordance with the parallax image in front of a parallax image print (that is, by installing two parallax barrier films constituted in accordance with the parallax image with a predetermined interval), an observer positioned away from the parallax image print by a predetermined distance can observe the right-eye image with the observer's right eye and the left-eye image with the observer's left eye, and therefore the observer can perform a naked-eye stereoscopic view on the basis of the right-eye image and the left-eye image.

Second Aspect

Figure 15:
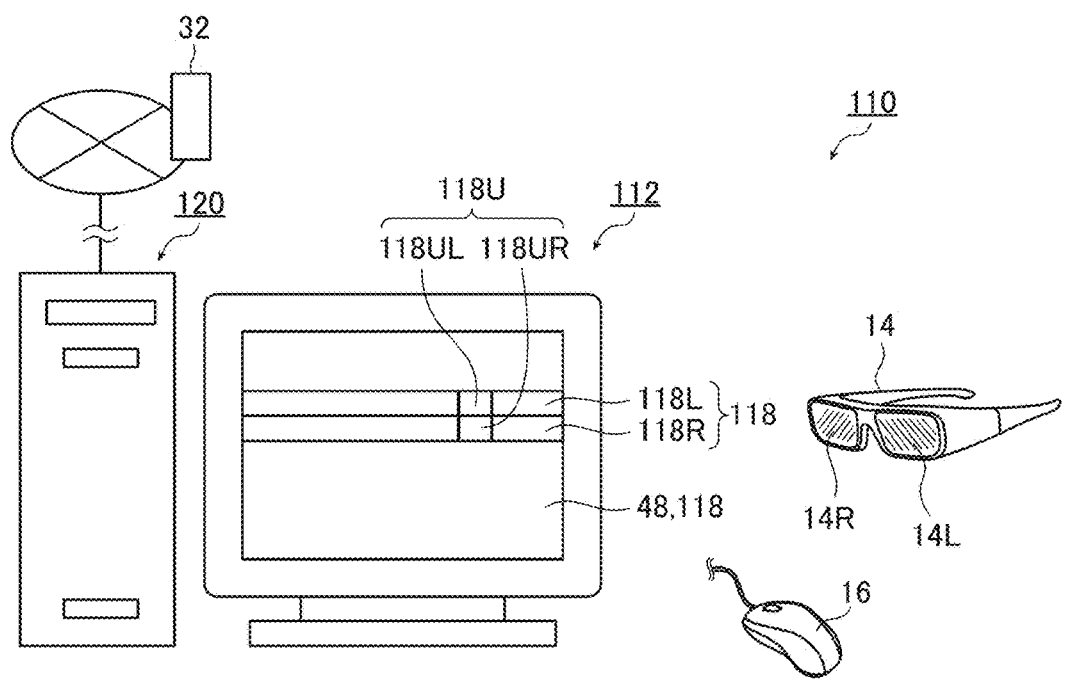
FIG. 15 is an appearance diagram illustrating an example of a parallax image display device according to a second aspect of the present invention.

FIG. 15 is an appearance diagram illustrating an embodiment of a configuration of a parallax image display device according to a second aspect of the present invention. As shown in FIG. 15, a parallax image display device 110 according to the present invention includes a second parallax image display unit 112, a pair of polarized glasses 14, an operation input unit 16, a console 120, and an image server 32. The polarized glasses 14, the operation input unit 16, and the image server 32 have the same configurations as in the first aspect and thus will not be repeatedly described.

As shown in FIG. 15, the second parallax image display unit 112 that displays a space-division parallax image comprises a right-eye region (right-eye image display area) 118R for displaying a right-eye image and a left-eye region (left-eye image display area) 118L for displaying a left-eye image.

The right-eye region 118R is composed of right-eye unit regions 118UR and the left-eye region 118L is composed of left-eye unit regions 118UL. A pair of the right-eye unit region 118UR and the left-eye unit region 118UL constitutes a unit region set 118U.

As the unit region set 118U, for example, as shown in FIG. 15, a stripe pattern can be considered. Needless to say, various patterns such as a hound's tooth pattern or a square-lattice pattern may be used.

Similarly to the first aspect, the second parallax image display unit 112 has a polarizing filter 48 capable of operating a polarization state of an arbitrary region, and the polarizing filter 48 is operated so that the polarization states for a region (right-eye region 118R) in which a right-eye image is displayed and a region (left-eye region 118L) in which a left-eye image is displayed are different from each other in the parallax image, similarly to the first aspect.

<Console>

Figure 16:
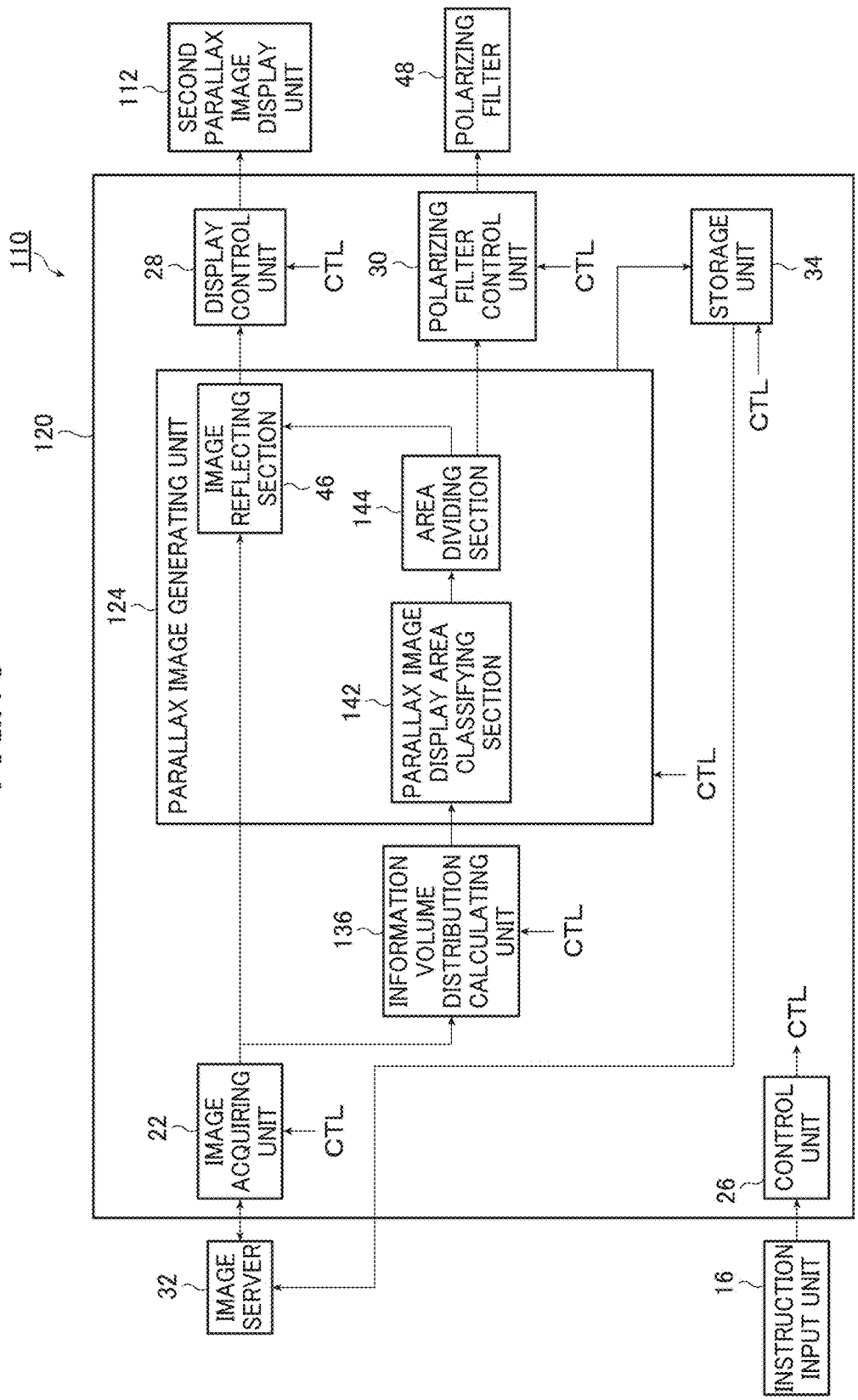
FIG. 16 is a block diagram illustrating a detailed configuration of the example of the parallax image display device shown in FIG. 15.

FIG. 16 is a block diagram illustrating a detailed configuration of the parallax image display device according to the second aspect of the present invention and in particular, shows the detailed configuration of the console 120.

As shown in FIG. 16, the console 120 includes an image acquiring unit 22, a parallax image generating unit 124, a control unit 26, a display control unit 28, a polarizing filter control unit 30, a storage unit 34, and an information volume distribution calculating unit 136. The parallax image generating unit 124 includes a parallax image display area classifying section 142, an area dividing section 144, and an image reflecting section 46. The image acquiring unit 22, the control unit 26, the display control unit 28, the polarizing filter control unit 30, the storage unit 34, and the image reflecting section 46 have the same configurations as in the first aspect and thus will not be repeatedly described.

Similarly to the first aspect, the console 120 is specifically constituted of a computer including a CPU (Central Processing Unit), a RAM (main storage device), a hard disk and the like. Actually, the CPU (Central Processing Unit), the RAM (main storage device), the hard disk, and the like work together to constitute the foregoing units and the sections of the console 120.

The information volume distribution calculating unit 136 calculates information volume distributions of the right-eye image and the left-eye image acquired by the image acquiring unit 22 and outputs the calculated information volume distribution of the right-eye image and the calculated information volume distribution of the left-eye image to the parallax image generating unit 124.

Here, examples of the information volume include (1) an amount of harmonic signal components of an image, (2) a value of the maximum frequency of an image, (3) a variance value of a brightness distribution of an image in a local region, and (4) a difference in pixel value between original right and left images.

Figure 17A:
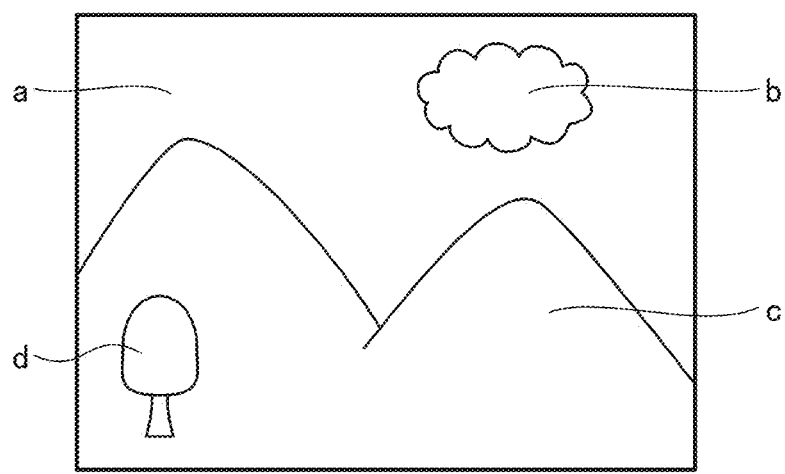
FIGS. 17A and 17B are diagrams each illustrating an example of a right-eye image and a left-eye image for a parallax image display.
Figure 17B:
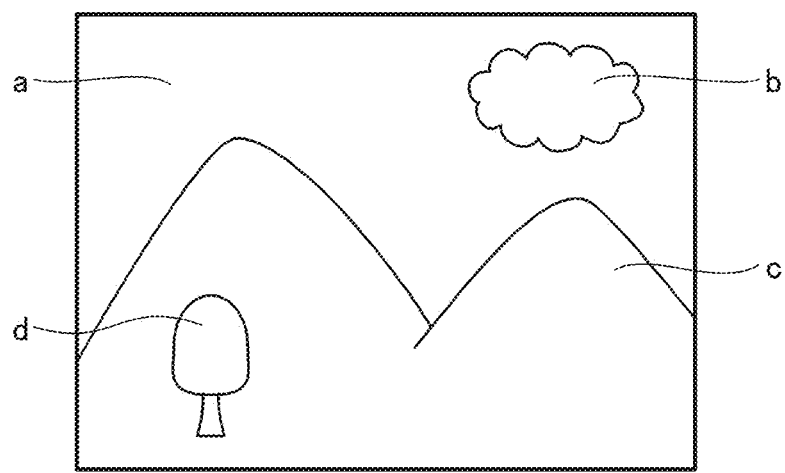

For example, in a right-eye image shown in FIG. 17A and a left-eye image shown in FIG. 17B, an information volume distribution is calculated by the information volume distribution calculating unit 136. For example, the information volume distribution is calculated using (1) an amount of harmonic signal components of an image described above as the information volume.

As shown in FIGS. 17A and 17B, the right-eye image and the left-eye image each include, for example, (a) sky, (b) cloud, (c) mountain, and (d) tree.

The parallax image generating unit 124 reflects the right-eye image and the left-eye image in the right-eye region 118R and the left-eye region 118L, respectively, as described above to generate the parallax image.

First, the parallax image display area classifying section 142 of the parallax image generating unit 124 classifies the parallax image into plural partial display areas 118D on the basis of the information volume distribution of the right-eye image and the information volume distribution of the left-eye image calculated by the information volume distribution calculating unit 136.

Figure 18:
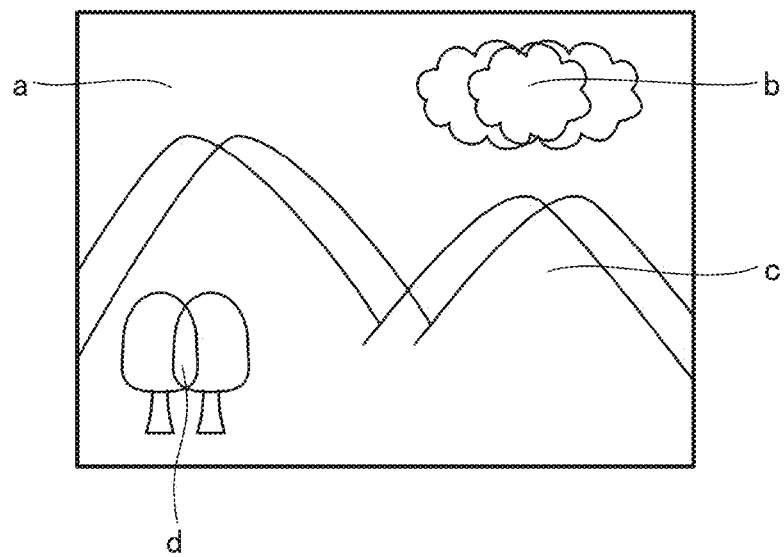
FIG. 18 is a diagram illustrating an example of a parallax image generated from the right-eye image and the left-eye image shown in FIG. 17.

As shown in FIG. 18, the parallax image is an image in which a right-eye image and a left-eye image are displayed in an overlapping manner (are spatially divided and displayed), and thus portions greatly different between the right-eye image and the left-eye image and substantially same portions are present.

In particular, information on the edge portions of (a) to (d) in the right-eye image and the left-eye image is important for performing a stereoscopic view with high accuracy.

The parallax image display area classifying section 142 classifies the parallax image into plural partial display areas 118D on the basis of the information volume distribution of the right-eye image and the information volume distribution of the left-eye image as described above.

Figure 19:
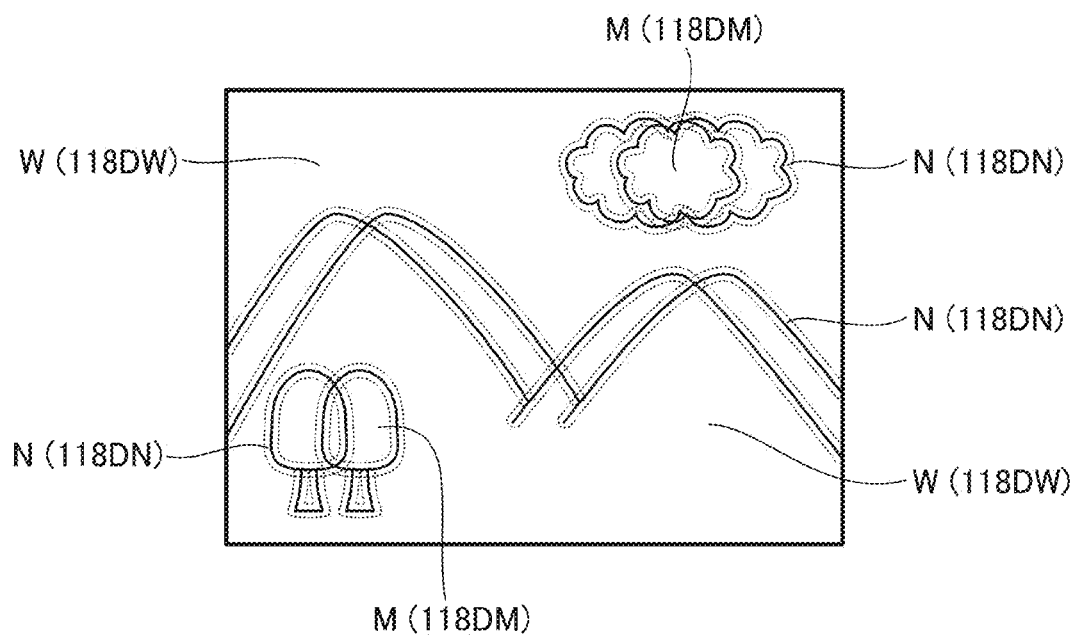
FIG. 19 is an explanatory diagram illustrating a case where the parallax image shown in FIG. 18 is classified into partial display areas.

For example, as shown in FIG. 19, the parallax image display area classifying section 142 classifies the peripheries of the edge portions of (a) to (d) as (N), the portions of (b) cloud and (d) tree as (M), and (a) sky and (c) mountain as (W), i.e., into three partial display areas 118D (118DN, 118DM, and 118DM).

The periphery of the edge portion means, for example, a region whose border is located away from the pixels constituting the edge by a predetermined number of pixels (for example, 10 pixels in radius).

Next, the area dividing section 144 divides the classified partial display areas 118D of (N), (M), and (W) into unit region sets 118U composed of a right-eye unit region 118UR and a left-eye unit region 118UL.

The size of the unit region set 118U differs depending on the information volume of each partial display area 118D of the parallax image calculated by the information volume distribution calculating unit 142 and a difference in the information volume (a difference between the information volume of the right-eye image and the information volume of the left-eye image).

For example, when information on the edge portions of the right-eye image and the left-eye image is included as in the partial display areas 118DN in FIG. 19, the partial display areas 118DN need to be divided into unit region sets 118UN as fine as possible.

The partial display areas 118DW shown in FIG. 19 are image portions such as (a) sky and (c) mountain not having very large variation, and thus the partial display areas 118DW may be divided into large (coarse) unit region sets 118UW.

When the image itself is fine to a certain extent like (b) cloud and (d) tree of the partial display areas 118DM, the partial display areas 118DM may be divided into unit region sets 118UM having a middle size.

The area dividing section 144 divides the parallax image display area 118 classified by the parallax image display area classifying section 142 as shown in FIG. 19 into unit region sets 118U having different sizes depending on the partial display areas 118D.

Figure 20:
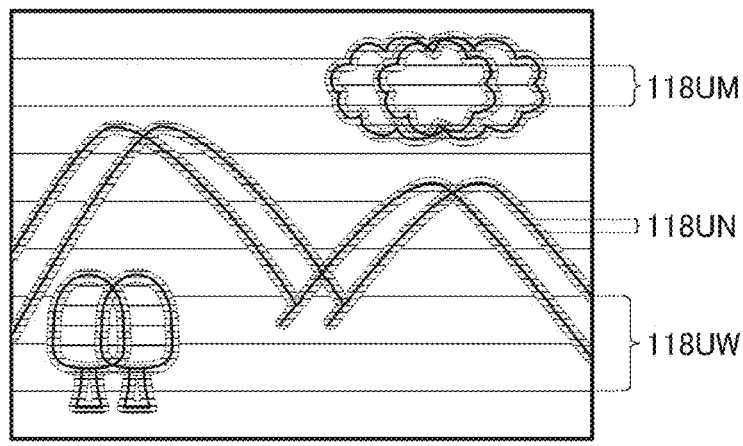
FIG. 20 is an explanatory diagram illustrating a case where the partial display areas shown in FIG. 19 are divided into unit area sets having different sizes (horizontally stripe patterns having different widths) in accordance with the classification.

Here, as shown in FIG. 20, the unit region sets 118U are configured to have the above-mentioned stripe pattern, a unit region set having a large width is set as a unit region set 118UW, a unit region set having a small width is set as a unit region set 118UN, and a unit region set having a middle width is set as a unit region set 118UM.

The image reflecting section 146 reflects the right-eye image and the left-eye image in each unit region set 118U (118UN, 118UM, and 118UW) so that the right-eye image is displayed in the right-eye unit region 118UR and the left-eye image is displayed in the left-eye unit region 118UL.

In this way, the parallax image generating unit 124 generates a parallax image on the basis of the right-eye image and the left-eye image.

The configuration of the parallax image display device 110 according to the second embodiment of the present invention is as explained above.

The operation of the parallax image display device 110 according to the second embodiment of the present invention will be described below in brief.

Upon receiving an instruction from the instruction input unit 16, the image acquiring unit 22 acquires the right-eye image and the left-eye image enabling a stereoscopic view as shown in FIGS. 17A and 17B. The acquired right-eye image and left-eye image are output to the information volume distribution calculating unit 136, and the information volume distribution of the right-eye image and the information volume distribution of the left-eye image are calculated and are output to the parallax image generating unit 124.

The parallax image display area classifying section 142 of the parallax image generating unit 124 classifies a parallax image display area, for example, into three partial display areas 118D of (N), (M), and (W) as shown in FIG. 19, on the basis of the information volume distribution of the right-eye image and the information volume distribution of the left-eye image calculated by the information volume distribution calculating unit 136.

The area dividing section 144 divides the partial display areas 118D classified as described above into unit region sets 118U having different sizes depending on the classification.

For example, as shown in FIG. 19, the partial display area 118DN considered to have a large information volume is divided into unit region sets 118UN which are as small as possible, the partial display area 118DW considered to have a small information volume is divided into unit region sets 118UW which are as large as possible, and the partial display area 118DM having a middle information volume is divided into unit region sets 118UM having a middle size.

The image reflecting section 146 reflects the right-eye image in the right-eye unit regions 118UR of the unit region sets 118U (118UN, 118UM, and 118UW) and reflects the left-eye image in the left-eye unit regions 118UL thereof to generate a parallax image.

The subsequent operations are the same as in the first aspect.

This is the operation of the parallax image display device 110 according to the second aspect of the present invention.

<Parallax Image Generation Method>

Next, a parallax image generation method according to the second aspect of the present invention will be described below. In the parallax image display device 110 according to the present invention, the parallax image generating unit 124 generates a parallax image using the parallax image generation method according to the present invention and the second parallax image display unit 112 displays the parallax image.

The parallax image generating unit 124 according to the present invention has an information volume distribution calculating unit 136 that calculates the information volume distributions of the right-eye image and the left-eye image.

Here, examples of the information volume include (1) an amount of harmonic signal components of an image, (2) a value of the maximum frequency of an image, (3) a variance value of a brightness distribution of an image in a local region, and (4) a difference in pixel value between original right and left images.

<Classification of Parallax Image Display Area>

In the right-eye image and the left-eye image shown in FIGS. 17A and 17B, the information volume distributions of the respective images are calculated and the parallax image display area 118 is classified into plural partial display areas 118D on the basis of the calculated information volume distributions.

Since the right-eye image and the left-eye image are images captured with different viewpoints, the information volume distributions of the right-eye image and the left-eye image are based on, from among the above-mentioned information volumes, for example, (1) an amount of harmonic signal components of an image, that is, fineness of an image.

As shown in FIGS. 17A and 17B, the right-eye image and the left-eye image include, for example, (a) sky, (b) cloud, (c) mountain, and (d) tree.

As shown in FIG. 18, the parallax image is an image in which a right-eye image and a left-eye image are displayed in an overlapping manner (are spatially divided and displayed) and thus information on the edge portions of (a) to (d) is important for performing a stereoscopic view with high accuracy.

On the basis of the calculated information volume distributions of the right-eye image and the left-eye image, the parallax image display area 118 is classified into three partial display areas 118D (118DN, 118DM, and 118DW) of (N), (M), and (W) as shown in FIG. 19 for example, by the parallax image display area classifying section 142.

<Division of Partial Display Area>

The parallax image generating unit 124 according to the present invention divides three different partial display areas 118D of (N), (M), and (W) into unit region sets 118U having different sizes depending on the classification through the area dividing section 144.

When the sizes of the information volumes of the three different partial display areas 118D shown in FIG. 19 satisfy (N)>(M)>(W), the sizes (coarseness) of the divisions of the partial display areas 118D satisfy (N)<(M)<(W).

When unit region sets 118U are configured to have a stripe pattern composed of the right-eye unit regions 118UR and the left-eye unit regions 118UL and the stripe widths in the classifications (N), (M), and (W) are different from each other (the stripe width is fine in the classification (N), middle in the classification (M), and coarse in the classification (W)), the parallax image display area 118 in which the partial display areas 118D are divided into unit region sets 118U by the area dividing section is displayed as shown in FIG. 20.

The unit region sets 118U having different stripe widths are allocated to the edge portions 118DN of the parallax image having a large information volume, the portions 118DM of the cloud and the tree having a large information volume in the original image, and the portions 118DW of the sky and the mountain having a small information volume.

Regarding the stripe widths of the unit region sets 118U, for example, the stripe width of the classification W for a small information volume (that is, the classification having a large stripe width) may be set to 16 pixels, the stripe width of the middle classification M may be set to 8 pixels, and the stripe width of the classification N for a large information volume (that is, the classification having a small stripe width) may be set to 4 pixels. The stripe widths may be changed depending on the pixel size of the parallax image or may be changed depending on the size or the shape of the partial display areas 118D.

The area dividing section 144 according to the present invention may change the dividing direction, that is, the stripe direction, depending on the shapes of the classified partial display areas 118D.

For example, when a partial display area 118D is long in the horizontal direction, the area dividing section 144 may divide the partial display area 118D into the stripe pattern in the horizontal direction (unit region sets 118U).

This is intended for preventing interference (moire) from occurring between the dividing direction, that is, the stripe direction of the stripe patterns and the spatial frequency of the image.

The parallax image generating unit 124 generates a parallax image by reflecting the right-eye image in the right-eye region 118R and the left-eye image in the left-eye region 118L in the parallax image display area 118, and the generated parallax image is displayed on the second parallax image display unit 112 having the parallax image display area 118 (corresponding to the parallax image display area 118 in a one-to-one manner).

<Flow of Parallax Image Generation>

Next, a parallax image generation method in the parallax image generating unit 124 will be described below in brief with reference to the flowchart shown in FIG. 21.

The parallax image display device 110 acquires a right-eye image and a left-eye image captured for a stereoscopic display from an unshown image server or the like through the parallax image generating unit 124 (step S101).

The parallax image generating unit 124 calculates respective information volume distributions of the right-eye image and the left-eye image (step S103).

As described above, the information volume distributions are calculated using, for example, at least one of (1) an amount of harmonic signal components of an image, (2) a value of the maximum frequency of an image, (3) a variance value of a brightness distribution of an image in a local region, and (4) a difference in pixel value between original right and left images, as the information volume.

The parallax image generating unit 124 classifies the parallax image display area 118 into plural partial display areas 118D on the basis of the information volume distribution of the right-eye image and the information volume distribution of the left-eye image.

The classification of the parallax image display area 118 is performed by the parallax image display area classifying section of the parallax image generating unit 124 on the basis of variation in the image, edge information of the image, or the like, from a difference between the information volume distribution of the right-eye image and the information volume distribution of the left-eye image for example (step S105).

The parallax image display area 118 is classified into three partial display areas 118D of (N), (M), and (W) as shown in FIG. 19 for example. Those are the edge-periphery portions (N), the portions (M) of the cloud and the tree having a large information volume in the original image, and the portions (W) of the sky and the mountain having a small information volume.

Then, the parallax image generating unit 124 divides the partial display areas 118D into unit region sets 118U (right-eye unit regions 118UR and left-eye unit regions 118UL) having different sizes depending on the classification through the area dividing section (step S107).

For example, when the right-eye unit regions 118UR and the left-eye unit regions 118UL are arranged in the stripe pattern, the stripe widths of the classifications (N), (M), and (W) of the partial display areas 118D are classified into small, middle, and large.

Figure 21:
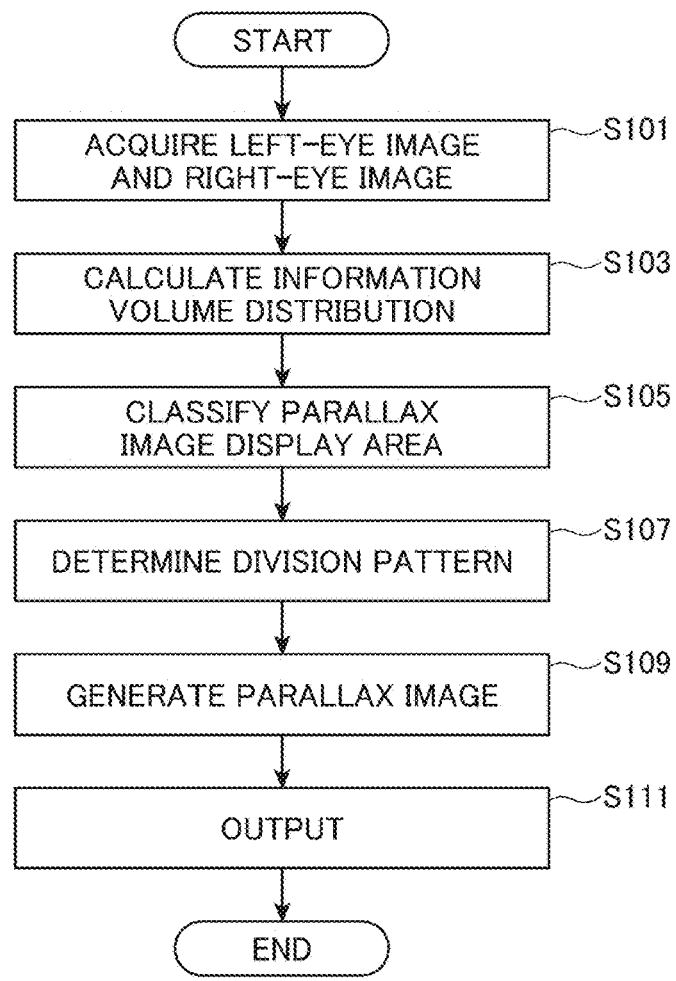
FIG. 21 is a flowchart illustrating a process flow of generating a parallax image according to the second aspect of the present invention.

The parallax image display area 118 is displayed as shown in FIG. 21 with the right-eye unit regions 118UR and the left-eye unit regions 118UL which are arranged in the stripe pattern.

The direction of the stripe pattern may be changed in a direction in which moire hardly occurs such as a vertical direction, a horizontal direction, and an oblique direction depending on the shapes of the partial display areas 118D (118DN, 118DM, and 118DW).

The parallax image generating unit 124 generates the parallax image by reflecting the left-eye image and the right-eye image in all the right-eye regions 118R and the left-eye regions 118L in the parallax image display area 118 (step S109). The displayed space-division parallax image is a parallax image in which a crosstalk hardly occurs and transmission of image information is not damaged.

The parallax image generated by the parallax image generating unit 124 is displayed on the second parallax image display unit 112 in which the parallax image display area 118 and the display screen correspond to each other in a one-to-one manner (step S111).

The parallax image may be output to an output device such as a printer as well as being displayed on the second parallax image display unit 112. This is because the present invention relates to a space-division stereoscopic display and does not require electrical drive.

<Parallax Image Print>

Similarly to the first aspect, the parallax image generated using the above-mentioned parallax image generation method may be output as a parallax image print by printing the parallax image on a paper sheet through an unshown printer or the like as well as being displayed on the second parallax image display unit 112 of the parallax image display device 110, as described above.

In this case, after the parallax image is printed on a paper sheet as a parallax image print, a polarizing film corresponding to the left-eye region 118L and the right-eye region 118R of the parallax image is pasted on the printed parallax image.

As described above, when the parallax image is observed using polarization, the left-eye image is recognized with the observer's left eye and the right-eye image is recognized with the observer's right eye even by setting the dividing direction of the stripe pattern of the parallax image to any direction such as a vertical direction and an oblique direction in addition to the lateral (horizontal) direction shown in FIGS. 15 and 20. Accordingly, the observer can perform a stereoscopic display.

<Parallax Barrier System>

In the parallax image display device 110 according to the second aspect of the present invention, the second parallax image display unit 112 may include a parallax barrier 50 to be described later instead of the polarizing filter 48. In this case, the parallax image is limited to a parallax image which is divided in a stripe pattern in the vertical direction (the direction perpendicular to the arrangement direction of the observer's eyes) shown in FIG. 9B, and the console 120 includes a parallax barrier control unit 31 that controls the parallax barrier in accordance with the parallax image (parallax image display area 118) generated by the parallax image generating unit 124, instead of the polarizing filter control unit 30.

The polarized glasses 14 are not necessary and a stereoscopic view can be performed with naked eyes.

The parallax barrier 50 is constituted of a switch liquid crystal that can electrically switch the presence or absence of transmission of light in an arbitrary region on a pixel basis, or the like.

The parallax barrier control unit 31 controls the parallax barrier 50 by electrically controlling the switch liquid crystal.

The parallax barrier 50 is disposed in front of the second parallax image display unit 112 with a certain distance, and the right-eye image is observed with the right eye and the left-eye image is observed with the left-eye as shown in FIG. 10A. Accordingly, the observer can perform a stereoscopic view using the right-eye image and the left-eye image.

In this case, as shown in FIG. 10A, the display area (information volume) of the right-eye image and the display area of the left-eye image are substantially equal to each other.

Figure 22:
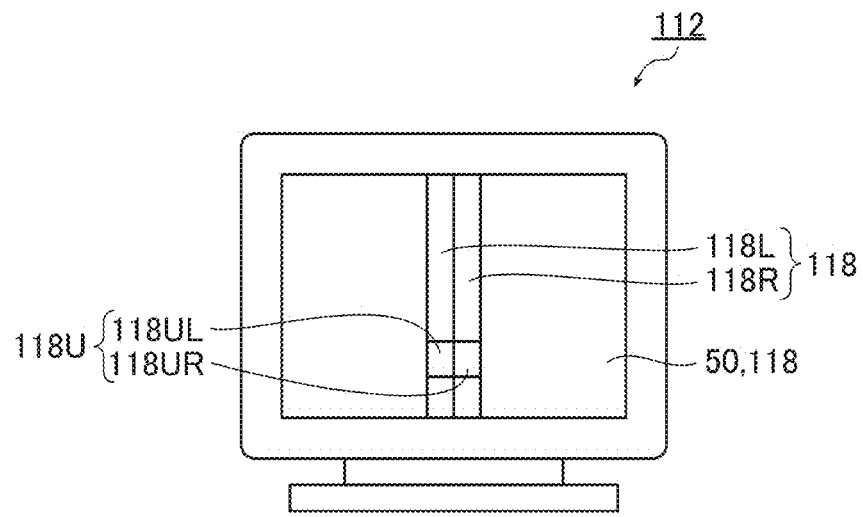
FIG. 22 is an appearance diagram illustrating an example of the parallax image display device according to the present invention employing a parallax barrier system.

As shown in FIG. 22, the parallax image display device 110 according to the present invention has the parallax barrier 50 in front of the second parallax image display unit 112, and when the parallax image divided in the vertical direction in a stripe pattern is generated by the parallax image generating unit 124, the parallax barrier 50 is operated so that an observer positioned away from the second parallax image display unit 112 by a predetermined distance can observe the right-eye image of the parallax image with the observer's right eye and the left-eye image of the parallax image with the observer's left eye.

Figure 23:
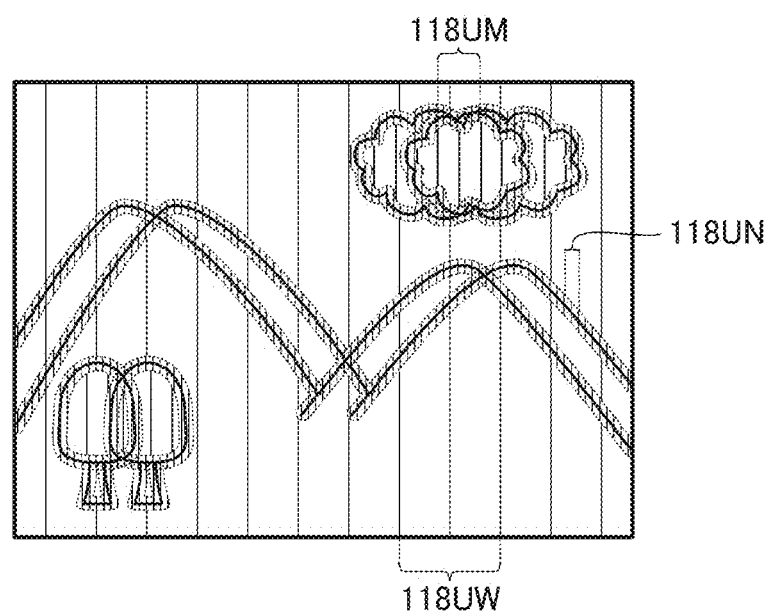
FIG. 23 is an explanatory diagram illustrating a case where the partial display areas shown in FIG. 19 are divided into unit area sets having different sizes (vertically stripe patterns having different widths) in accordance with the classification in the parallax barrier system.

In the parallax barrier type stereoscopic display device 110, since the parallax image is limited to the stripe pattern in the vertical direction as described above, the partial display areas 118D classified as shown in FIG. 19 as a result of comparison of the information volumes are divided not in the stripe patterns in the horizontal direction as shown in FIG. 20 but in the stripe patterns in the vertical direction as shown in FIG. 23 to generate the parallax image.

Thus, by observing the parallax image generated through the parallax barrier 50 as described above, an observer can recognize the right-eye image with the right eye and the left-eye image with the left eye, and thus can perform a stereoscopic view with naked eyes on the basis of the right-eye image and the left-eye image.

Also in the above-mentioned parallax image print, a parallax barrier film can be used instead of the polarizing film. In this case, similarly to the above, the polarized glasses 14 are not necessary and it is possible to perform a stereoscopic view with naked eyes.

As the parallax barrier film, for example, a combination of a non-light-transmitting film not transmitting light and a light-transmitting film transmitting light, which do not require electrical drive, can be considered.

By installing (pasting) the parallax barrier film constituted in accordance with the parallax image in front of a parallax image print with a certain distance, an observer positioned away from the parallax image print by a predetermined distance can observe the right-eye image with the observer's right eye and the left-eye image with the observer's left eye, and thus the observer can perform a naked-eye stereoscopic view on the basis of the right-eye image and the left-eye image.

While the parallax image display device, the parallax image generation method, and the parallax image print according to the present invention have been described in detail, the present invention is not limited to the above-mentioned aspects and may be improved or modified in various forms without departing from the gist of the present invention.

What is claimed is:

1. A parallax image display device comprising a computer, wherein the computer comprises:
    an image acquiring processor adapted to acquire a right-eye image and a left-eye image used for generating a parallax image enabling a stereoscopic view;
    an information volume distribution calculating processor adapted to calculate an information volume distribution of the right-eye image and an information volume distribution of the left-eye image;
    a parallax image generating processor adapted to generate the parallax image from the right-eye image and the left-eye image on the basis of the information volume distribution of the right-eye image and the information volume distribution of the left-eye image; and
    a first parallax image display adapted to have a parallax image display area in which square reference regions are arranged in a grid pattern,
    wherein the parallax image generating processor compares an information volume of the right-eye image and an information volume of the left-eye image in each of the reference regions on the basis of the information volume distribution of the right-eye image and the information volume distribution of the left-eye image, allocates one selected from a group consisting of only a right-eye region for displaying the right-eye image, only a left-eye region for displaying the left-eye image, and both of the right-eye region and the left-eye region in each of the reference regions on the basis of a size of information volumes of the right-eye image and the left-eye image, and displays the right-eye image and the left-eye image in the right-eye region and the left-eye region, respectively, to generate the parallax image,
    wherein the information volume of each of the reference regions is at least one of an amount of harmonic signal components of the right-eye image or the left-eye image corresponding to each of the reference regions, a value of a maximum frequency of the right-eye image or the left-eye image corresponding to each of the reference regions, a variance value of a brightness distribution of the right-eye image or the left-eye image corresponding to each of the reference regions, and a difference in pixel value between the right-eye image and the left-eye image corresponding to each of the reference regions,
    wherein the parallax image generating processor comprises an information volume comparing processor, a reference region allocating processor, an image reflecting processor, and a brightness regulating processor,
    wherein the information volume comparing processor is adapted to compare an information volume of the right-eye image and an information volume of the left-eye image, both corresponding to a same one of the reference regions, in each of the reference regions on the basis of the information volume distribution of the right-eye image and the information volume distribution of the left-eye image, and output a comparison result,
    wherein the reference region allocating processor is adapted to change region areas of the right-eye region and the left-eye region depending on size of the information volume and allocate the right-eye region and the left-eye region to different regions in each of the reference regions on the basis of the comparison result,
    wherein the image reflecting processor is adapted to generate the parallax image by reflecting the right-eye image and the left-eye image in the right-eye region and the left-eye region, respectively, and
    wherein the brightness regulating processor is adapted to increase brightness of the area of the right-eye region or the left-eye region allocated in each of the reference regions as the allocated area is smaller, and decrease brightness of the allocated area as the allocated area is larger.

2. The parallax image display device according to claim 1, wherein the reference region is composed of at least four pixels.

3. The parallax image display device according to claim 1, further comprising a polarizing filter that is disposed in front of the first parallax image display and that can be operated on the basis of the parallax image so that a polarization state of the left-eye region and a polarization state of the right-eye region are different from each other.

4. The parallax image display device according to claim 1, further comprising a two-layer parallax barrier that is disposed in front of the first parallax image display and that can be operated on the basis of the parallax image so that only light from the left-eye region is transmitted toward a left eye of an observer and only light from the right-eye region is transmitted toward a right eye of the observer, with the observer being positioned away from the first parallax image display by a predetermined interval.

5. A parallax image generation method comprising steps of:
- calculating information volume distributions of a right-eye image and a left-eye image which are used to display a stereoscopic view;
- comparing, in a parallax image display area in which square reference regions are arranged in a grid pattern, an information volume of the right-eye image and an information volume of the left-eye image in each of the reference regions on the basis of the information volume distribution of the right-eye image and the information volume distribution of the left-eye image,
- allocating one selected from a group consisting of only a right-eye region for displaying the right-eye image, only a left-eye region for displaying the left-eye image, and both of the right-eye region and the left-eye region in each of the reference regions on the basis of a size of information volumes of the right-eye image and the left-eye image, and
- generating a parallax image by displaying the right-eye image and the left-eye image in the right-eye region and the left-eye region, respectively,
- wherein the information volume of each of the reference regions is at least one of an amount of harmonic signal components of the right-eye image or the left-eye image corresponding to each of the reference regions, a value of a maximum frequency of the right-eye image or the left-eye image corresponding to each of the reference regions, a variance value of a brightness distribution of the right-eye image or the left-eye image corresponding to each of the reference regions, and a difference in pixel value between the right-eye image and the left-eye image corresponding to each of the reference regions, and the method further comprising:
- comparing the information volumes in each of the reference regions by each of the reference regions on the basis of the information volume distribution of the right-eye image and the information volume distribution of the left-eye image,
- changing region areas of the right-eye region and the left-eye region depending on size of the information volumes, allocating the right-eye region and the left-eye region to different regions in each of the reference regions in the right-eye image and the left-eye image, and evenly allocating both of the right-eye region and the left-eye region to each of the reference regions when both the information volumes are substantially equal to each other, and
- increasing brightness of an area of the right-eye region or the left-eye region allocated in each of the reference regions as the allocated area is smaller, and decreasing brightness of the allocated area as the allocated area is larger.

6. A parallax image print, wherein the parallax image generated by the parallax image generation method according to claim 5 is printed.

7. The parallax image print according to claim 6, wherein a polarizing film having a polarization state for the right-eye region and a polarization state for the left-eye region which are different from each other is pasted.

8. The parallax image print according to claim 6, wherein there is provided a two-layer parallax barrier film that is disposed in front of the parallax image print and that transmits only light from the left-eye region toward a left eye of an observer and transmits only light from the right-eye region toward a right eye of the observer on the basis of the parallax image, with the observer being positioned away from the parallax image print by a predetermined interval.

9. The parallax image display device according to claim 1, further comprising a second parallax image display adapted to have a parallax image display area composed of a right-eye region for displaying the right-eye image and a left-eye region for displaying the left-eye image,
- wherein the parallax image generating processor has a parallax image display area classifying processor and an area dividing processor,
- wherein the parallax image display area classifying processor is adapted to classify the parallax image display area into a plurality of partial display areas on the basis of the information volume distributions,
- wherein the area dividing processor is adapted to divide each of the partial display areas into unit region sets each composed of a right-eye unit region and a left-eye unit region, the unit region sets being different in size and same in shape depending on the classification, and
- wherein the parallax image generating processor generates the parallax image by displaying the right-eye image in the right-eye region composed of the right-eye unit regions and displaying the left-eye image in the left-eye region composed of the left-eye unit regions.

10. The parallax image display device according to claim 9,
- wherein an information volume of the information volume distribution is at least one of a variation in pixel value which is fineness of the image, an amount of harmonic signal components in the image, a value of a maximum frequency in the image, a variance value of a brightness distribution, and a difference in pixel value between the right-eye image and the left-eye image.

11. The parallax image display device according to claim 9,
- wherein the area dividing processor divides each of the partial display areas into smaller unit region sets when its information volume is larger and divides each of the partial display areas into larger unit region sets when its information volume is smaller.

12. The parallax image display device according to claim 9,
- wherein the unit region sets have a stripe pattern.

13. The parallax image display device according to claim 9,
- wherein the area dividing processor determines a dividing direction of the partial display areas depending on a shape of the partial display areas.

14. The parallax image display device according to claim 9, further comprising a polarizing filter that is disposed in front of the second parallax image display and that can be operated on the basis of the parallax image so that a polarization state of the left-eye region and a polarization state of the right-eye region are different from each other.

* * * * *